US008050402B2

(12) United States Patent
Golic

(10) Patent No.: US 8,050,402 B2
(45) Date of Patent: Nov. 1, 2011

(54) METHOD AND RELATED DEVICE FOR HARDWARE-ORIENTED CONVERSION BETWEEN ARITHMETIC AND BOOLEAN RANDOM MASKING

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 855 days.

(21) Appl. No.: 11/791,981

(22) PCT Filed: Dec. 1, 2004

(86) PCT No.: PCT/EP2004/053203
§ 371 (c)(1),
(2), (4) Date: Apr. 29, 2008

(87) PCT Pub. No.: WO2006/058561
PCT Pub. Date: Jun. 8, 2006

(65) Prior Publication Data
US 2009/0112896 A1    Apr. 30, 2009

(51) Int. Cl.
*G06F 7/00* (2006.01)
(52) U.S. Cl. .......................................... 380/28; 380/29
(58) Field of Classification Search ............... 726/9, 26, 726/27, 28, 29; 713/224, 201, 212, 213, 713/220, 223; 709/204, 201, 220, 227; 389/200, 389/201, 202, 203, 227
See application file for complete search history.

(56) References Cited

U.S. PATENT DOCUMENTS

| 6,295,606 B1 | 9/2001 | Messerges et al. |
| 2001/0053220 A1 | 12/2001 | Kocher et al. |
| 2003/0084336 A1* | 5/2003 | Anderson et al. ............. 713/200 |
| 2003/0140240 A1 | 7/2003 | Jaffe et al. |
| 2007/0058800 A1* | 3/2007 | Neisse et al. .................... 380/28 |

FOREIGN PATENT DOCUMENTS

DE    102 01 449 C1    8/2003

OTHER PUBLICATIONS

Kocher; "Timing Attacks on Implementations of Diffie-Hellman, RSA, DSS, and Other Systems", Cryptography Research, Inc., pp. 1-10.
Goubin, et al., "DES and differential power analysis—The duplication method", Cryptographic Hardware and Embedded Systems, CHES '99, pp. 158-172, (1999).

(Continued)

*Primary Examiner* — Vivek Srivastava
*Assistant Examiner* — Nega Woldemariam
(74) *Attorney, Agent, or Firm* — Finnegan, Henderson, Farabow, Garrett & Dunner, L.L.P.

(57) ABSTRACT

A method for secure conversion between two different random markings used for cryptographic functions, converts a first binary data word, masked by a binary mask word according to a first masking process, into a corresponding second binary data word, masked by said binary mask word according to a second masking process, the first and second binary data words and the binary mask word including corresponding pluralities of bits, wherein each of the pluralities of the bits includes a least significant bit, a first bit, and at least one i-th bit $i \geq 2$.

21 Claims, 10 Drawing Sheets

OTHER PUBLICATIONS

Golic, "DeKaRT: A new paradigm for key-dependent reversible circuits", Cryptographic Hardware and Embedded Systems—CHES 2003, pp. 98-112 and pp. 1-26, (2003).

SHA-1 National Institute of Standards and Technology, FIPS Publication 180-1—Federal Information Processing Standards Publication, Secure Hash Standard, 24 pages, (1995).

Lai, et al., "A proposal for a new block encryption standard", Institute for Signal and Information Processing Swiss Federal Institute of Technology, Advances in cryptology—Eurocrypt '90, pp. 389-404, (1991).

Rivest, et al., "The RC6 block cipher", v.1.1., pp. 1-19, (1998).

Kocher et al.; "Differential Power Analysis", Cryptography Research, Inc., Michael Wiener (Ed): CRYPTO'99, LNCS 1666, pp. 388-397, (1999).

Messerges, "Securing the AES Finalists Against Power Analysis Attacks", Fast Software Encryption. International Workshop, vol. 1978, XP-001040960, pp. 150-164, (Apr. 2000).

Coron, et al., "On Boolean and Arithmetic Masking against Differential Power Analysis", Cryptographic Hardware and Embedded Systems. International Workshop, XP-000989986, pp. 231-237, (2000).

Goubin, "A Sound Method for Switching between Boolean and Arithmetic Masking", Cryptographic Hardware and Embedded Systems, $3^{rd}$ International Workshop, CHES 2001, vol. 2162, XP-008002644, pp. 3-15, (May 14, 2001).

Coron, et al., "A New Algorithm for Switching from Arithmetic to Boolean Masking", Lecture Notes in Computer Science, Springer Vergal, vol. 2779, XP-002340677, pp. 89-97, (2003).

\* cited by examiner

METHOD AND RELATED DEVICE FOR HARDWARE-ORIENTED CONVERSION BETWEEN ARITHMETIC AND BOOLEAN RANDOM MASKING

CROSS REFERENCE TO RELATED APPLICATION

This application is a national phase application based on PCT/EP2004/053203, filed Dec. 1, 2004, the content of which is incorporated herein by reference.

FIELD OF THE INVENTION

The present invention generally relates to the field of cryptography, particularly to cryptographic methods and devices and, even more particularly, to methods for preventing information leakage attacks on integrated circuits implementing cryptographic functions in hardware.

BACKGROUND OF THE INVENTION

Cryptographic functions dealing with secret keys, such as, for example, block ciphers or message authentication codes, can be implemented either in software or in hardware on microelectronic data-processing devices such as, for example, Integrated Circuit (IC) chip cards (sometimes also referred to as "smart cards").

During the execution of a generic cryptographic function, sensitive data depending on the secret key(s) are processed, sent over the internal links of the IC, and stored in the internal memories of the data-processing device.

In the attempt to prevent unauthorized people from fraudulently getting knowledge of the cryptographic secret key(s) or other sensitive information by tampering, tamper-resistant IC chips are produced: in such IC chips, special physical countermeasures are specifically provided for, in order to protect the underlying IC against tampering, such as, for example, protective layers and various sensors, detectors, and filters.

However, even in tamper-resistant IC chips, sensitive information may leak out through various side channels, such as, for example, by measuring signal timings, power consumption, and radiated electromagnetic energy, as well as by monitoring the signals by microprobing.

This leakage of information poses a serious problem: a good cryptographic function generally satisfies the requirement that it should be computationally infeasible to reconstruct the secret key from the knowledge of input/output data, but one such requirement is normally not necessarily satisfied if intermediate sensitive data, generated during the execution of the cryptographic function, are revealed.

Recovering the secret key from intermediate sensitive data that may leak out through any possible side channel during the execution of the cryptographic function is the objective of various cryptanalytic attacks, which are referred to as side-channel attacks. Therefore, there is a need to protect intermediate sensitive data that are generated during the execution of the cryptographic function which, when leaking out, may enable unauthorized third parties fraudulently reconstructing the secret key.

The side-channel attacks do not change the functionality of the device that implements the cryptographic process, and are typically not invasive. Power analysis attacks (proposed for example in P. Kocher et al., "Differential power analysis," Advances in Cryptology—Crypto '99, Lecture Notes in Computer Science, vol. 1666, pp. 388-397, 1999) are very powerfill, as they do not require expensive resources; moreover, most implementations of cryptographic functions, especially in software, are vulnerable to such attacks, unless specific countermeasures are incorporated.

In particular, in the class of power analysis attacks, the so-called (first-order) Differential Power Analysis (DPA) attacks are especially practically important as they use a relatively simple statistical technique that is almost independent of the implementation of the cryptographic algorithm. They require measuring the power consumption of the cryptographic algorithm for a number of known inputs (or known outputs). Other, more sophisticated statistical analysis of power consumption curves may also be feasible.

The basis of power analysis attacks are elementary computations within the device used to implement the cryptographic function (the cryptographic device), computations which depend on the secret key information and on the known input and/or output information. If, in addition, the power consumption corresponding to these elementary computations depends on the values being computed, then the cryptographic device's power consumption curves contain information about the secret key, and such information may be extracted by statistical techniques, so as to reconstruct the secret key.

Software implementations of cryptographic functions, in which the operations are synchronized by the clock of the data processing unit, usually a microprocessor, running the algorithm that implements the cryptographic function, are especially vulnerable to power analysis attacks.

Hardware implementations of cryptographic functions are also potentially vulnerable to power analysis attacks, although a higher sampling frequency may be required for obtaining the power consumption curves.

A general algorithmic strategy to counteract power analysis attacks is to randomize the computations that depend on the secret key, by masking the original data with random masks, and by modifying the computations accordingly. This can be done for software or hardware implementations. An approach of this type, given in L. Goubin and J. Patarin, "DES and differential power analysis—The duplication method," Cryptographic Hardware and Embedded Systems—CHFS '99, Lecture Notes in Computer Science, vol. 1717, pp. 158-172, 1999, proposes a data splitting technique to protect implementations of DES and other block ciphers against DPA attacks, where the input message as well as all intermediate data are each split into two parts, so that the original data can be recovered by the bitwise XOR or some other appropriate operation. The nonlinear parts of the algorithm, such as the S-boxes, are implemented by appropriate lookup tables of increased size (in Read Only Memory—ROM).

US patent application No. US 2001/0053220 A1 contains a similar proposal, except that the data parts can also be bit-permuted. The nonlinear parts of the algorithm, such as the S-boxes, can be implemented as lookup tables being updated accordingly (in Random Access Memory—RAM).

The Applicant points out that data splitting technique is essentially equivalent to random masking technique investigated in T. Messerges, "Securing the AES finalists against power analysis attacks," Fast Software Encryption—FSE 2000, Lecture Notes in Computer Science, vol. 1978, pp. 150-164, 2001, except that in the latter, instead of performing duplicate computations on data shares, one performs a modified computation involving original data and random masks applied. All three mentioned approaches are primarily intended for software implementations.

An alternative way of dealing with power analysis attacks is making use of a special encoding of data that tends to balance the power consumption, for example, by representing the data through binary vectors with a fixed number of ones, such as the dual-rail encoding. In particular, US patent application No. US 2003/0140240 A1 describes a technique for protecting hardware implementations of cryptographic algorithms against power analysis attacks on the logic gate level, where the power consumption is balanced by encoding of all data by binary vectors with a fixed number of ones and by balancing the logic gate transitions.

In order to prevent the DPA attack on a microelectronic device implementing a cryptographic algorithm by means of a digital IC, it is sufficient to ensure that every elementary computation involving the secret information and performed by a logic gate is randomized. More precisely, the general condition to be satisfied is that the output value of each logic gate in the protected hardware design should have the same probability distribution for each given, fixed value of the secret key and input data. In other words, the output value of each logic gate in the digital IC that implements the cryptographic algorithm should be statistically independent of the secret key and input data. Here and throughout the present description this mathematical condition is referred to as the "secure computation condition", and is first explicitly proposed in J. Golić, "DeKaRT: A new paradigm for key-dependent reversible circuits," Cryptographic Hardware and Embedded Systems—CHES 2003, Lecture Notes in Computer Science, vol. 2779, pp. 98-112, 2003). The necessary uncertainty is provided by using purely random masks, preferably produced by a fast random number generator implemented in hardware, and integrated in the IC chip.

It is observed that a secure computation on the word level, in software, in general does not imply a secure computation on the bit level, in hardware, although the word-level security may provide more resistance to more sophisticated power analysis attacks such as, for example, the higher-order DPA attacks. In practice, the secure computation condition on the bit level is necessary for providing resistance to (the first-order) DPA attacks and is also likely to be sufficient, although individual logic gates do not achieve their final (random) values simultaneously and, in the transition stage, their output values may vary (randomly) and may depend on their previous inputs. This effect is also present in software implementations and, in fact, generally makes the power analysis of non-masked implementations more difficult, especially so for logic circuit implementations in hardware.

The masking operation that combines the data (input, output, and intermediate) with a random mask is typically adapted to the nature of the mathematical operations used in the cryptographic algorithm, because in this way the required modifications in the computations are minimized.

More precisely, let it be assumed that in some elementary computation in the cryptographic algorithm, x and y form the inputs to a logic gate, which combines together these inputs into an output z by using a group operation & according to: x & y=z (a group operation being, according to the group theory, an operation, defined on a set, that is associative, has an identity element and is such that every element of the set has an inverse element). Using any group operation for masking is sufficient to perfectly randomize the data; thus, let it be assumed that the inputs x and y are randomized by the same group operation & and by using the random masks $r_x$ and $r_y$, respectively. Then, in view of:

$$(x \& r_x) \& (y \& r_y) = (x \& y) \& (r_x \& r_y) = z \& (r_x \& r_y),$$

the resulting output z is thus automatically randomized by the mask $r_z = r_x \& r_y$, so that the computation does not need not to be modified.

More generally, if z=f(x,y), for a given function f (not necessarily a group operation), and if it is desired to obtain a masked output z & $r_z$ from masked inputs x & $r_x$ and y & $r_y$, then the function f (and thus the computations) has to be modified into a new function h determined by h(x,y)=f(x & $r_x$, y & $r_y$) & $r_z$, and the problem is how to compute this function h securely.

Consequently, in the masked cryptographic algorithm, only the elementary computations different from the underlying group operation &, which is exploited for the masking process, have to be modified.

In general, the group operations on binary words most frequently used in cryptographic algorithms are the bitwise eXclusive OR (XOR) and the addition modulo an integer which is a power of 2. In view of the fact that the XOR of two binary values actually corresponds to their addition modulo 2, the bitwise XOR and the addition modulo $2^n$ of two n-bit words x and y, are henceforth denoted as $x+_2y$ and $x+_ny$, respectively.

The above-cited paper by J. Golic describes a general theoretical framework for the protection against DPA attacks by XOR random masking on the logic gate (i.e., hardware) level. A hardware technique, that is, a logic circuit for XOR random masking of a 2-input (MUltipleXer) MUX gate, with a control input selecting which one of the two data inputs is to be taken to the output, is proposed in U.S. Pat. No. 6,295,606 B1 and is meant to be used for masking lookup table implementations of Boolean functions to be used in cryptographic algorithms. However, the secure computation condition as defined above cannot be found in U.S. Pat. No. 6,295,606 B1. Another hardware technique for random masking of logic gates is proposed in German patent No. DE 10201449 C1, but the Applicant observes that the technique is flawed as it does not satisfy the secure computation condition defined above.

In many algorithms, the $x+_2y$ and $x+_ny$ operations, along with other Boolean and integer operations, are combined together for the cryptographic security. The best-known examples are the widely used cryptographic hash function SHA-1 (National Institute of Standards and Technology, FIPS Publication 180-1, Secure Hash Standard, 1994), the block cipher IDEA (X. Lai and J. Massey, "A proposal for a new block encryption standard," Advances in Cryptology—Eurocrypt '90, Lecture Notes in Computer Science, vol. 473, pp. 398-404, 1991), and the block cipher RC6 (R. L. Rivest et al., "The RC6 block cipher," v.1.1, August 1998, available at http://www.rsasecurity.com/rsalabs/rc6). The SHA-1 incorporates a secret key if it is used for message authentication, for example, in the so-called HMAC construction. In such algorithms, it is convenient to use both of the above-mentioned group operations ($x+_2y$ and $x+_ny$) for random masking.

The random masking based on the addition modulo $2^n$ is commonly called "arithmetic masking", whereas the random masking based on the addition modulo 2 (or bitwise XOR) is commonly called "Boolean masking".

Therefore, there is a need to convert between the two corresponding masks in a computationally secure way, that is, in a way secure against power analysis attacks such as DPA. Namely, given an n-bit data word x and an n-bit random masking word (random mask) r, the problem is to compute securely $x+_nr$ starting from $x+_2r$, and vice versa.

Previously proposed solutions to the mask conversion problem are essentially software instead of hardware oriented, meaning that the elementary computations considered are based on words rather than individual bits. According to them it appears that the conversion from arithmetic masking to Boolean masking is inherently more difficult than the conversion from Boolean masking to arithmetic masking. More precisely, in L. Goubin, "A sound method for switching between Boolean and arithmetic masking," Cryptographic Hardware and Embedded Systems—CHES 2001, Lecture Notes in Computer Science, vol. 2162, pp. 3-15, 2001, two solutions are proposed: one for the conversion from Boolean to arithmetic masking, and the other for the conversion from arithmetic to Boolean masking. The first solution requires seven n-bit word operations and an auxiliary n-bit random masking word, namely, five bitwise XOR operations and two subtractions modulo $2^n$. The second solution is much less efficient and requires 5(n+1) n-bit word operations and an auxiliary n-bit random masking word. For comparison, note that the direct conversion of the masks can be achieved by one $+_2$ and one $+_n$ n-bit word operation, but is not computationally secure.

Another software-oriented solution for the conversion from arithmetic masking to Boolean masking is proposed in J.-S. Coron and A. Tcbulkine, "A new algorithm for switching from arithmetic to Boolean masking," Cryptographic Hardware and Embedded Systems—CHES 2003, Lecture Notes in Computer Science, vol. 2779, pp. 89-97, 2003. The proposed solution requires certain precomputation and storage and some auxiliary random masking bits, but can be more efficient than the solution described above, depending on the processor word size.

SUMMARY OF THE INVENTION

In view of the state of the art outlined in the foregoing, the Applicant has dealt with the problem of performing random masking at the hardware level in IC chips implementing cryptographic functions.

In particular, the problem solved by the Applicant has been how to perform a secure conversion from arithmetic masking to Boolean random masking, and vice versa, in those IC chips that implements cryptographic functions involving both arithmetic and Boolean operations. A secure conversion means that the output value of each logic gate in the digital logic circuit that implements the conversion algorithm should be statistically independent of the input data, the statistical independence being provided by the random mask.

The Applicant has found a new technique for conversion from arithmetic masking to Boolean random masking, and vice versa, which allows secure and efficient conversion on a bit-basis.

According to first aspect of the present invention, a method for the secure conversion between two different random maskings, particularly from arithmetic to Boolean random masking and vice versa is provided as set forth below.

The method for secure conversion comprises converting a first binary data word, masked by a binary mask word according to a first masking process, into a corresponding second binary data word, masked by said binary mask word according to a second masking process; the first and second binary data words and the binary mask word comprising corresponding pluralities of bits, wherein each of said pluralities of bits includes a least significant bit, a first bit, and at least one i-th bit, provided that $i \geq 2$. The conversion method comprises:

taking as a least significant bit of the second binary data word the least significant bit of the first binary data word;
calculating the first bit of the second binary data word by:
performing a first XORing of the least significant bit of the binary mask word with the first bit of the first binary data word and selecting as a value of the first bit of the second binary data word either a result of said first XORing or the first bit of the first binary data word, depending on a value related to the least significant bit of the first or the second binary data word; and
calculating the i-th bit of the second binary data word by:
performing a second XORing of the i-th bit of the first binary data word with the (i−1)-th bit of the binary mask word;
performing a third XORing of the i-th bit of the first binary data word with a first value related to the (i−1)-th bit of the first or the second binary data word; and
selecting as a value of the i-th bit of the second binary data word a result of either said second XORing or said third XORing, depending on a second value related to the (i−1)-th bit of the first or the second binary data word.

In particular, said performing the first XORing comprises:
performing a first logic AND of the least significant bit of the binary mask word with a logic complement of the first bit of the first binary data word;
performing a second logic AND of a logic complement of the least significant bit of the binary mask word with the first bit of the first binary data word; and
performing a logic OR of the results of said first and second logic ANDs.

Said selecting as a value of the first bit of the second binary data word either the result of said first XORing or the first bit of the first binary data word, may comprise:
performing a third logic AND of the result of said first XORing with a logic complement of said value related to the least significant bit of the first or the second binary data word;
performing a fourth logic AND of the first bit of the first binary data word with said value corresponding to the least significant bit of the first or the second binary data word; and
performing a logic OR of the results of said third and fourth logic ANDs.

Said performing the second XORing may in particular comprise:
performing a fifth logic AND of a logic complement of the i-th bit of the first binary data word with the (i−1)-th bit of the binary mask word;
performing a sixth logic AND of the i-th bit of the first binary data word with a logic complement of the (i−1)-th bit of the binary mask word; and
performing a logic OR of the results of said fifth and sixth logic ANDs.

According to an embodiment of the present invention, said performing the third XORing comprises:
performing a seventh logic AND of a logic complement of the i-th bit of the first binary data word with said first value related to the (i−1)-th bit of the first or the second binary data word;
performing an eighth logic AND of the i-th bit of the first binary data word with a logic complement of said first value related to the (i−1)-th bit of the first or the second binary data word; and
performing a logic OR of the results of said seventh and eighth logic ANDs.

In particular, said selecting as a value of the i-th bit of the second binary data word a result of either said second XORing or said third XORing may comprise:
performing a ninth logic AND of the result of said second XORing with a logic complement of said second value related to the (i−1)-th bit of the first or the second binary data word;
performing a tenth logic AND of the result of said third XORing with said second value related to the (i−1)-th bit of the first or the second binary data word; and performing a logic OR of the results of said ninth and tenth logic ANDs.

According to an embodiment of the invention, said performing one or more among said first, second, and third XORing comprises:
performing a first logic NAND of a first and a second operands of said XORing;
performing a second logic NAND of the first operand and of a result of said first logic NAND;
performing a third logic NAND of the second operand and of a result of said first logic NAND; and
performing a fourth logic NAND of the results of said second and third logic NANDs.

According to an embodiment of the present invention, said selecting as a value of the first bit of the second binary data word either a result of said first XORing or the first bit of the first binary data word, depending on a value related to the least significant bit of the first or the second binary data word, comprises:
supplying as a first and a second operands to a fifth logic NAND said value related to the least significant bit of the first or the second binary data word;
performing a sixth logic NAND between a result of said fifth logic NAND and a result of said first XORing;
performing a seventh logic NAND between a result of said fifth logic NAND and the first bit of the first binary data word; and
performing an eighth logic NAND of the result of said seventh and eighth logic NANDs.

Also, according to an embodiment of the present invention, said selecting as a value of the i-th bit of the second binary data word a result of either said second XORing or said third XORing, depending on a second value related to the (i−1)-th bit of the first or the second binary data word, comprises:
supplying as a first and a second operands to a ninth logic NAND said second value related to the (i−1)-th bit of the first or the second binary data word;
performing a tenth logic NAND between a result of said ninth logic NAND and a result of said second XORing;
performing an eleventh logic NAND between a result of said ninth logic NAND and a result of said third XORing; and
performing a twelfth logic NAND of the result of said tenth and eleventh logic NANDs.

The mask conversion method according to the present invention is bit-based, in a sense that all the elementary operations considered are on the bit level, and is hence suitable for direct implementation in hardware, for example by means of combinatorial logic circuits made up of standard logic gates. No additional random masking bits, apart from those present in the data mask, are required.

The basic two properties of every logic circuit are the number of logic gates involved (the gate count) and the maximal delay (also referred to as the "depth") expressed as the sum of delays of logic gates involved in the corresponding critical path. The Applicant has found that the mask conversion method according to the present invention is equally efficient, in terms of gate count, for both the conversion from Boolean to arithmetic masking and the conversion from arithmetic to Boolean masking; in particular, the number of logic gates required is roughly the same as that necessary for one $+_n$ n-bit word operation. At the logic gate level, there is no essential asymmetry between the two mask conversions.

In particular, the Applicant has found that the delay of the logic circuit performing the conversion from arithmetic masking to Boolean masking is about one half of the delay of the logic circuit performing the conversion from Boolean masking to arithmetic masking, and is roughly the same as that for one $+_n$ n-bit word operation The conversion method according to the present invention is, from a practical viewpoint, important for providing protection against power analysis (e.g., DPA) and other side-channel attacks of hardware implementations of cryptographic algorithms, such as for example the keyed hash function SHA-1 used for message authentication in a number of widely spread cryptographic protocols.

Moreover, the method according to the present invention can also be used for the secure computation of the arithmetic masking operation $x+_n r$, where x is a secret n-bit word and r is an n-bit random mask. Should the masked value be computed directly in terms of the carry bits, then the computation would not be secure on the logic gate level, as the carry bits are dependent on x and are thus not fully randomized. The secure computation can be achieved by first computing $x+_2 r$ by using n 2-bit XORS, and then by converting $x+_2 r$ into $x+_n r$ by the new technique.

Other aspects of the invention concern a mask conversion circuit arrangement implementing the above method, an integrated circuit integrating at least one of such mask conversion circuit arrangements, a smart-card including at least one such integrated circuit.

A still further aspect of the invention concerns a Subscriber Identity Module (SIM) adapted to be used in conjunction with a user equipment in a communications network and including a smart-card as defined above.

BRIEF DESCRIPTION OF THE DRAWINGS

The features and advantages of the present invention will be made apparent by the following detailed description of some embodiments thereof, provided merely by way of non-limitative examples, description that will be conducted making reference to the annexed drawings, wherein.

DETAILED DESCRIPTION OF THE PREFERRED EMBODIMENT(S) OF THE INVENTION

Hereinafter, four embodiments of a mask conversion method in accordance to the present invention for carrying on the conversion between Boolean random masking and arithmetic random masking and vice versa will be described, together with their possible hardware implementation in terms of simple logic gates. In particular, two of the embodiments that will be described are suitable for carrying out the conversion from Boolean random masking to arithmetic random masking, whereas the other two embodiments are suitable for carrying out the opposite conversion, from arithmetic random masking to Boolean random masking.

The underlying assumption for the secure computation is that the random mask is uniformly distributed, which can be achieved by using a fast random number generator implemented in hardware. Strictly speaking, ideally, a new mask has to be generated for each new input data to the cryptographic function being protected.

Figure 10:
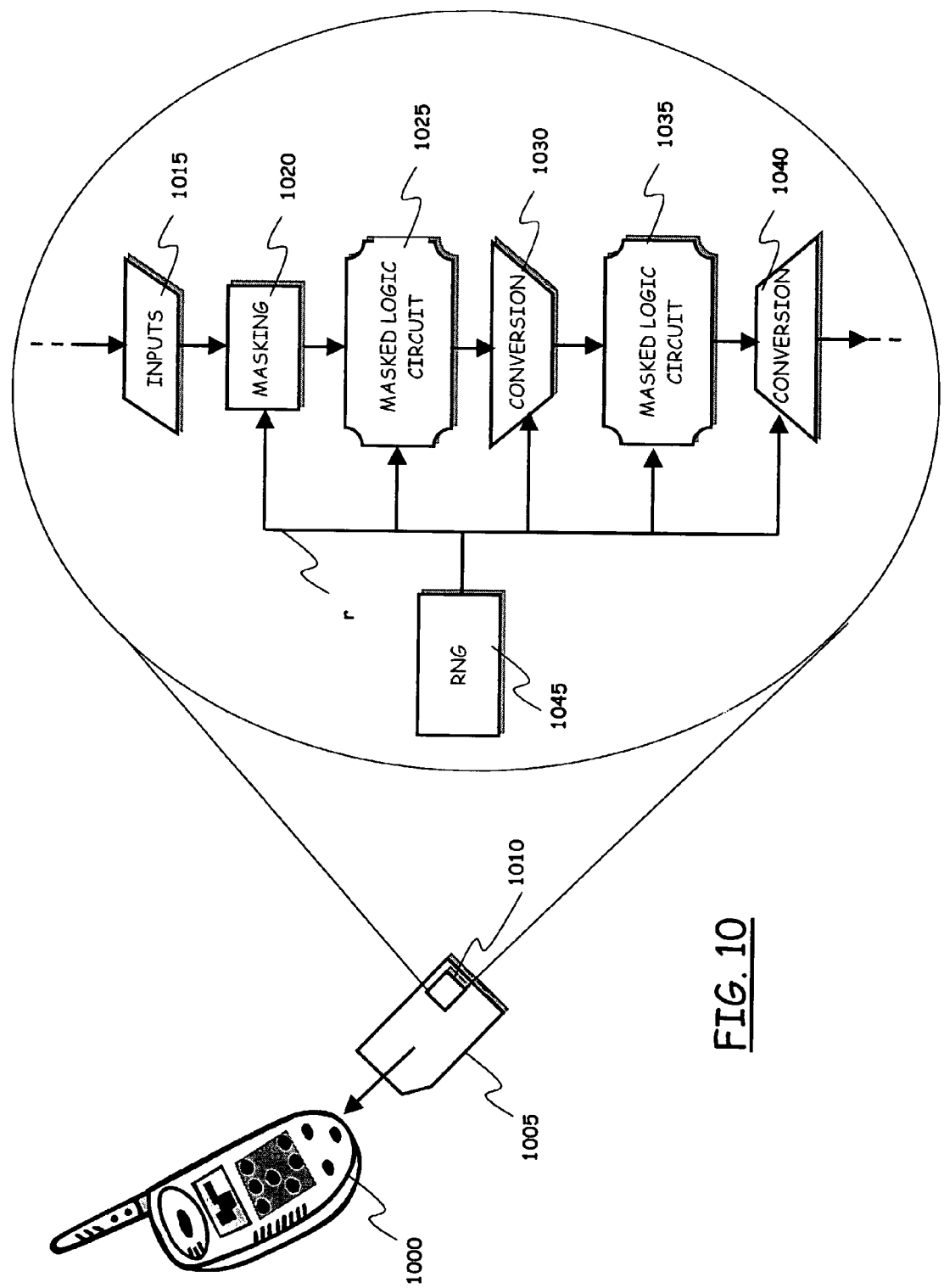
FIG. 10 shows, very schematically, an exemplary scenario in which the present invention can be advantageously applied.

Before starting the description of the various embodiments of the present invention, reference is made to FIG. 10, wherein an exemplary scenario in which the random mask conversion is advantageously applied is depicted.

In particular, the scenario considered is that of mobile communications systems, e.g., a mobile communications network such as, for example, a GPRS/EDGE or a third-generation, UMTS network, through which users equipped with suitable mobile communications terminals (or user equipments) 1000 can communicate with each other, exchange messages and, possibly, multimedia contents, and surf over the Internet.

As is known, the mobile terminals 1000 work in conjunction with a Subscriber Identification Module (SIM) 1005 (a so-called USIM in the case of UMTS), which mainly serves for purposes of authentication of the users in the communications network.

The SIM 1005 is a smart-card module, with an IC chip 1010 embedded therein. The IC chip 1010 typically includes a data processor, e.g., a microcontroller with suitable memory resources (ROM, RAM).

With the enrichment of the breed of services that are offered to the users of mobile communications networks, the IC chip 1010 is more and more required to perform sophisticated functions in addition to user's authentication. One of such functions is to implement cryptography; this is for example useful in those end-to-end contexts wherein users of the mobile communication network are allowed to exchange secure, i.e., encrypted and authenticated (SMS) messages as well as to authenticate each other on the end-to-end basis. In particular, cryptography may be implemented in hardware, by integrating suitable logic circuitry.

As discussed in the introductory part of the present specification, in order to prevent cryptanalytic attacks that may reveal the secret key(s) used for encrypting/decrypting purposes, random masking can be implemented at the very hardware level, i.e., at the level of the logic circuits that implement the chosen cryptographic function (e.g., the hash function SHA-1 in the HMAC mode of operation, used for authenticating the messages). This is schematically depicted in the encircled area in the drawing. A Random Number Generator (RNG) 1045, preferably a fast RNG implemented in hardware in the IC chip 1010, generates a random mask r, i.e., an n-bit random number.

The random mask r is used to mask, through a masking function 1020, input data 1015 to the cryptographic function to be performed. In particular, the masking function is advantageously a group operation, and, even more particularly, a bitwise XOR or a modulo $2^n$ summation/subtraction. In fact, these two operations are the most frequently used group operations that are typically performed on binary data words in nowadays common cryptographic algorithms: using them to mask the data avoids the need of modifying the corresponding elementary computations.

The masked input data are then fed to a masked logic circuit (a logic gate ensemble) 1025, that performs a masked elementary computation comprising a part of the cryptographic algorithm. In particular, if an elementary computation is, e.g., a bitwise XOR (dual considerations apply in the case of a modulo $2^n$ addition/subtraction), and the masking function is chosen to be the same group operation, then the masked logic circuit 1025 actually coincides with the original, non-masked circuit.

A subsequent elementary computation in the cryptographic algorithm may be for example the other group operation, in the cited example the modulo $2^n$ addition/subtraction, performed by the masked logic circuit 1035. A random mask conversion 1030 from, in the example considered, the initial Boolean masking to the arithmetic masking is then carried out, so as to avoid the necessity of modifying the logic circuit 1035.

Then, a further mask conversion 1040 may be performed, and so on until all the elementary computations comprising the cryptographic function are completed. If between any two successive mask conversions, there are also some elementary computations different from the corresponding group operations, then they also have to be masked by appropriate masked logic circuits. As this is not the subject of the present invention, the corresponding masked logic circuits are for simplicity not shown in FIG. 10.

FIGS. 1A, 1B, 2A, and 2B, relate to a mask conversion method according to a first embodiment of the present invention, for the conversion from Boolean to arithmetic masking.

In mathematical terms, adopting the notations $+_2$ and $+_n$ for indicating the bitwise modulo 2 (Boolean) and the modulo $2^n$ (arithmetic) addition of n-bit words, respectively, given an n-bit data word $x = x_{n-1} x_{n-2} \ldots x_1 x_0$ and an n-bit random masking word (random mask) $r = r_{n-1} r_{n-2} \ldots r_1 r_0$ (the least significant bit in the n-bit words is denoted by index 0), the mask conversion problem is to compute securely $x +_n r$ from $x +_2 r$, in the sense defined in the foregoing. Let $$x' = x'_{n-1} x'_{n-2} \ldots x'_1 x'_0 = x +_2 r$$

be the Boolean-masked data word obtained from the starting data word x by applying the Boolean random mask r, that is, by applying the random mask r via $+_2$ operation, and let $$x'' = x''_{n-1} x''_{n-2} \ldots x''_1 x''_0 = x +_n r$$

be the arithmetic-masked data word obtained from the starting data word x by applying the arithmetic random mask r, that is, by applying the random mask r via $+_n$ operation.

Let the following notation be adopted for representing the Boolean operations: $+_2$, as already defined, stands for the XOR operation (addition modulo 2), OR stands for the logic OR operation (or disjunction), $\neg$ stands for the NOT operation (or binary complement); the logic AND or conjunction is denoted without any symbol, by just concatenating the symbols of the operands. In the drawings, the logic AND and OR operations are depicted by using the symbols $\wedge$ and $\vee$, respectively.

The XOR operation can be implemented according to:

$$x+_2y = \neg xy \text{ OR } x\neg y$$

or, equivalently, according to:

$$x+_2y = \text{MUX}(y, \neg y, x)$$

where $\text{MUX}(x,y,c) = \neg cx \text{ OR } cy$ is the Boolean function implemented by a MUX ("MUltipleXer") gate with two data inputs x and y and one control input c.

The mask conversion method according to this embodiment of the present invention involves a computation that is defined recursively by the following equations (equations (1)):

$$x''_0 = x'_0$$

$$x''_1 = \neg x'_0(\neg x'_1 r_0 \text{ OR } x'_1 \neg r_0) \text{ OR } x'_0 x'_1$$

$$x''_i = \neg x'_{i-1}(\neg x'_i r_{i-1} \text{ OR } x'_i \neg r_{i-1}) \text{ OR } x'_{i-1}(\neg x'_i \neg x''_{i-1} \text{ OR } x'_i x''_{i-1}), \text{for } 2 \leq i \leq n-1.$$

The equations (1) are derived by starting from the well-known school method for computing the integer addition with carry. Here and throughout, the algebraic derivations are not included for simplicity, as the equations, as well as their secure computation can be checked directly, by a simple mathematical analysis.

Figure 1A:
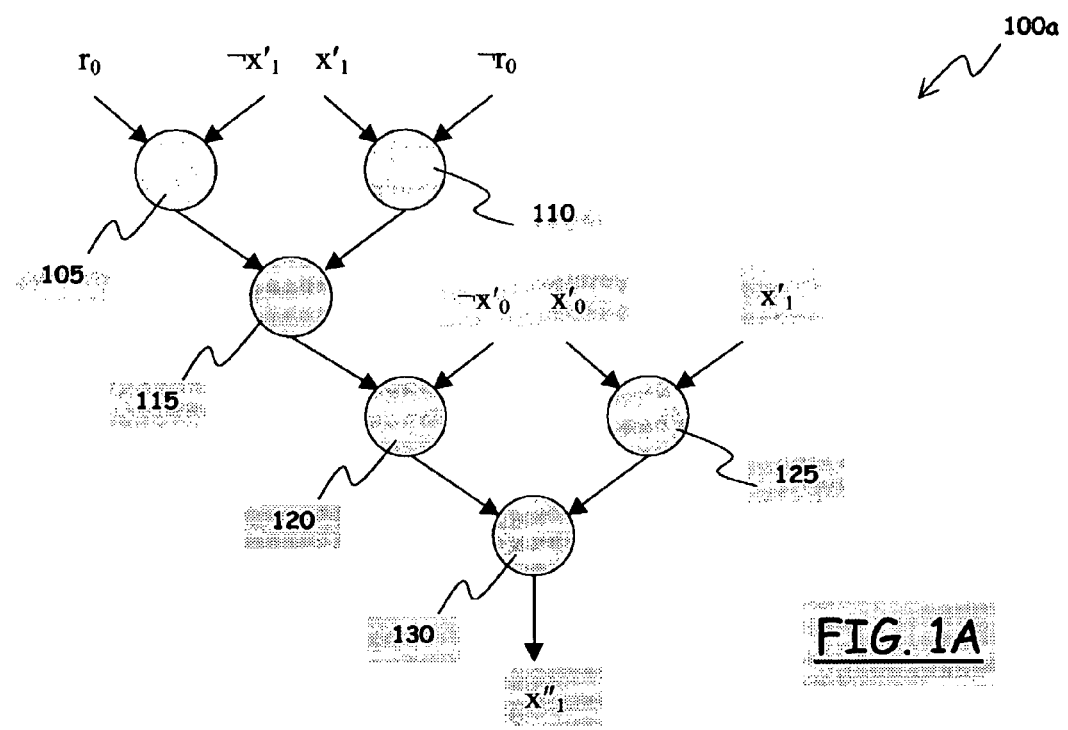
FIGS. 1A and 1B are schematic diagrams of logic circuits adapted to implement a mask conversion method according to a first embodiment of the present invention, for the conversion from Boolean random masking to arithmetic random masking.
Figure 1B:
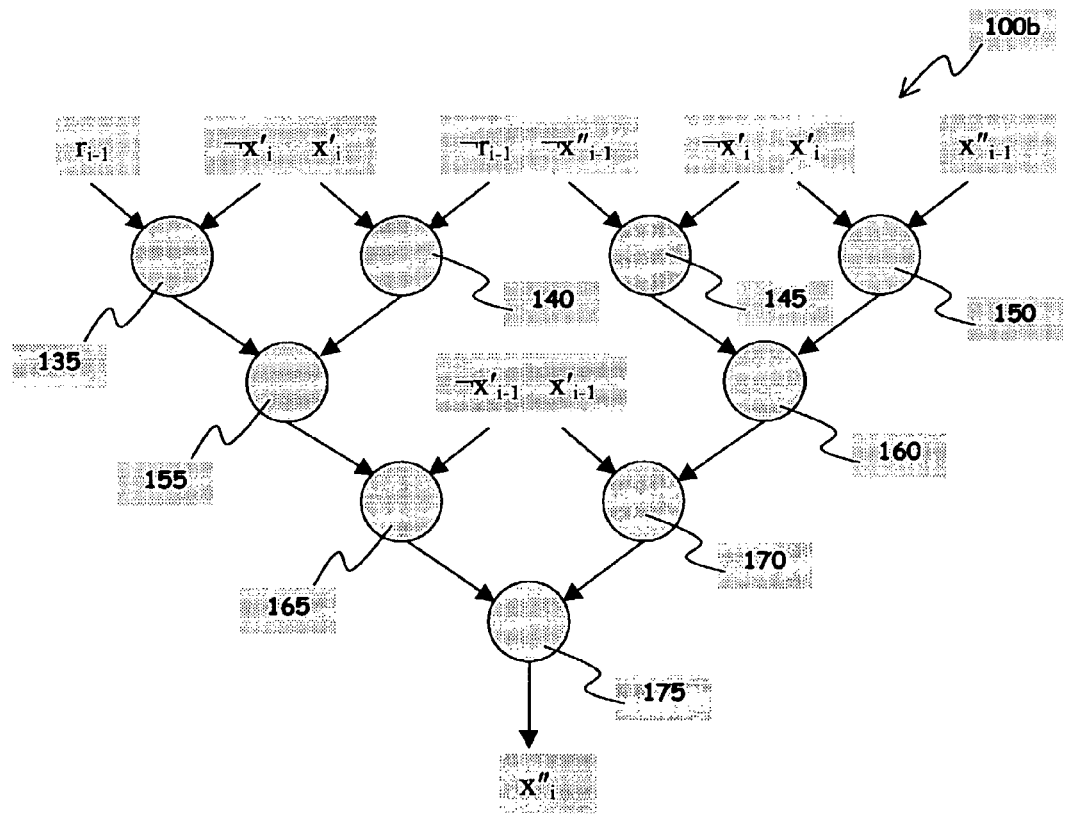

The equations (1) can be practically implemented, in hardware, by means of simple logic gates, as depicted in FIGS. 1A and 1B, wherein reference numeral 100a denotes the logic circuit implementing the second equation of equations (1) (i.e., the circuit adapted to generate the bit $x''_1$ of the data word x'' obtained from the starting data word x by applying the arithmetic random mask), and reference numeral 100b identifies the logic circuit implementing the third equation of equations (1) (i.e., the circuit adapted to generate the generic further bit $x''_i$ of the data word x'').

In particular, referring to FIG. 1A, the least significant bit $r_0$ of the mask word r and the logic complement of the bit $x'_1$ of the Boolean-masked data word x' are combined in AND by an AND logic gate 105; the bit $x'_1$ is also combined in AND with the logic complement of the random mask bit $r_0$ by an AND logic gate 110. The outputs of the two AND logic gates 105 and 110 are fed to an OR logic gate 115. The output of the OR logic gate 115 is combined in AND with the logic complement of the least significant bit $x'_0$ of the Boolean-masked data word x' by an AND logic gate 120; the bit $x'_0$ is also combined in AND with the bit $x'_1$ by an AND logic gate 125. The outputs of the AND logic gates 120 and 125 are OR-ed together by an OR logic gate 130, to produce the desired bit $x''_1$.

Referring to FIG. 1B, the bit $r_{i-1}$ of the mask word r and the logic complement of the bit $x'_i$ of the Boolean-masked data word x' are combined in AND by an AND logic gate 135; the bit $x'_i$ is also combined in AND with the logic complement of the random mask bit $r_{i-1}$ by an AND logic gate 140. Furthermore, the logic complement of the bit $x''_{i-1}$ of the arithmetic-masked data word x'' and the logic complement of the bit $x'_i$ are combined in AND by an AND logic gate 145; the bits x's and $x''_{i-1}$ are also combined in AND by an AND logic gate 150.

Outputs of the two AND logic gates 135 and 140 are fed to an OR logic gate 155. Similarly, outputs of the two AND logic gates 145 and 150 are fed to an OR logic gate 160.

The output of the OR logic gate 155 is combined in AND with the logic complement of the bit $x'_{i-1}$ by an AND logic gate 165. The bit $x'_{i-1}$ is also combined in AND with the output of the OR logic gate 160, by an AND logic gate 170. The outputs of the AND logic gates 165 and 170 are OR-ed together by an OR logic gate 175, to produce the desired bit $x''_i$.

It can be appreciated that logic gates necessary for implementing the desired mask conversion function are the OR, AND, and NOT gates (the NOT gates are not shown in the drawings for the sake of simplicity), which are all elementary logic gates in terms of hardware implementation.

It is observed that, in equations (1), the logic OR operation might be replaced by the XOR operation; however, from the hardware implementation viewpoint, this may be disfavourable, as the OR logic gate is typically more elementary than the XOR logic gate.

However, the XOR operations that can replace OR operations in equations (1), can be viewed as a special case of the MUX operation: this suggests putting the equations (1) in the following equivalent form (equations (2)):

$$x''_0 = x'_0$$

$$x''_1 = \text{MUX}(x'_1 +_2 r_0, x'_1, x'_0)$$

$$x''_i = \text{MUX}(x'_i +_2 r_{i-1}, x'_i +_2 \neg x''_{i-1}, x'_{i-1}), \text{for } 2 \leq i \leq n-1.$$

Figure 2A:
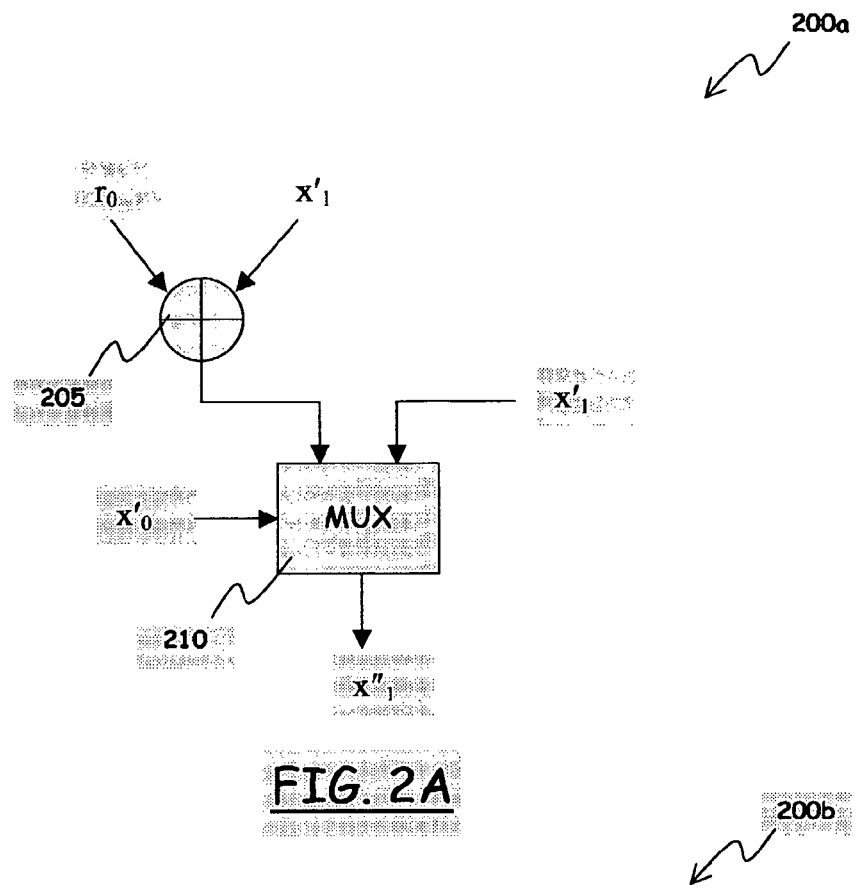
FIGS. 2A and 2B are schematic diagrams of logic circuits functionally equivalent to those depicted in FIGS. 1A and 1B, adapted to implement the mask conversion method according to the first embodiment of the present invention.
Figure 2B:
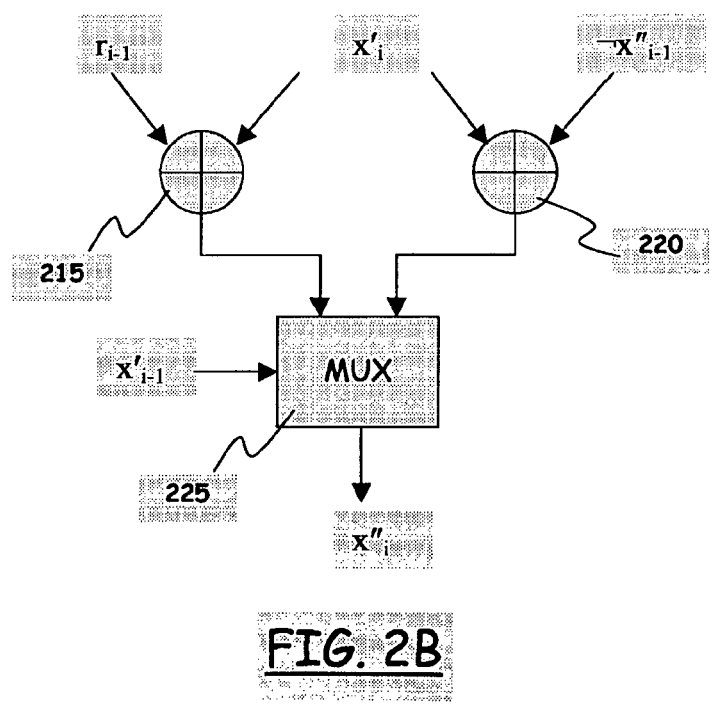

The equations (2) can be practically implemented, in hardware, by means of the logic circuits depicted in FIGS. 2A and 2B, wherein reference numeral 200a denotes the logic circuit implementing the second equation of equations (2), and reference numeral 200b identifies the logic circuit implementing the third equation of equations (2) (also in this case the NOT logic gates are not shown, for simplicity of the drawings).

In particular, referring to FIG. 2A, the least significant bit $r_0$ of the mask word r and the bit $x'_1$ of the Boolean-masked data word x' are combined in XOR by an XOR logic gate 205; the output of the XOR logic gate 205 and the bit $x'_1$ form the inputs to a MUX logic gate 210, controlled by the bit $x'_0$; an output of the MUX logic gate 210 represents the desired bit $x''_1$.

Similarly, referring to FIG. 2B, the bit $r_{i-1}$ of the mask word r and the bit $x'_i$ of the Boolean-masked data word x' are combined in XOR by an XOR logic gate 215; the bit $x'_i$ is also combined in XOR with the logic complement of the bit $x''_{i-1}$, by an XOR logic gate 220.

The outputs of the XOR logic gates 215 and 220 form the inputs to a MUX logic gate 225, controlled by the bit $x'_{i-1}$; the output of the MUX logic gate 225 represents the desired bit $x''_i$.

The logic circuits depicted in FIGS. 2A and 2B are functionally equivalent to those depicted in FIGS. 1A and 1B.

A mathematical analysis can show that the output of each logic gate in the circuits of FIGS. 1A, 1B, 2A, and 2B is computed securely, i.e., that it has the same probability distribution for every fixed value of the input x. In other words, all the elementary computations are secure on the logic gate level against DPA attacks. The desired randomization is provided by $x'_i$, that is, by the underlying masking bit $r_i$, which is independent of $r_{i-1}$, $x''_{i-1}$, and $x'_{i-1}$.

Unlike the previously proposed techniques, it is interesting that no additional masking bits are required.

In both cases, the logic gate count is equivalent to 3n−4 MUX gates, and the depth is about 2(n−1) MUX gates. For comparison purposes, it should be noted that the school method for integer addition with carry has an equivalent gate count of about 3n−4 MUX gates and a depth of about n MUX gates. This shows that the proposed logic circuits for the mask conversion are indeed very simple.

FIGS. 3A, 3B, 4A, and 4B, relate to a mask conversion method according to a second embodiment of the present invention, for the conversion from arithmetic to Boolean masking.

In mathematical terms, given an n-bit data word x and an n-bit random mask word r, the mask conversion problem is to compute securely $x+_2r$ from $x+_nr$.

Also in this case, the computation is defined recursively by the following equations, where the same notation as in the previously discussed embodiment has been adopted. As above, the equations are based on the well-known school method for computing the integer addition with carry. The equations obtained are (equations (3)):

$$x'_0 = x''_0$$

$$x'_1 = \neg x'_0(\neg x''_1 r_0 \text{ OR } x''_1 \neg r_0) \text{ OR } x'_0 x''_1$$

$$x'_i = \neg x'_{i-1}(\neg x''_i r_{i-1} \text{ OR } x''_i \neg r_{i-1}) \text{ OR } x'_{i-1}(\neg x''_i \neg x''_{i-1} \text{ OR } x''_i x''_{i-1}), \text{for } 2 \leq i \leq n-1.$$

Figure 3A:
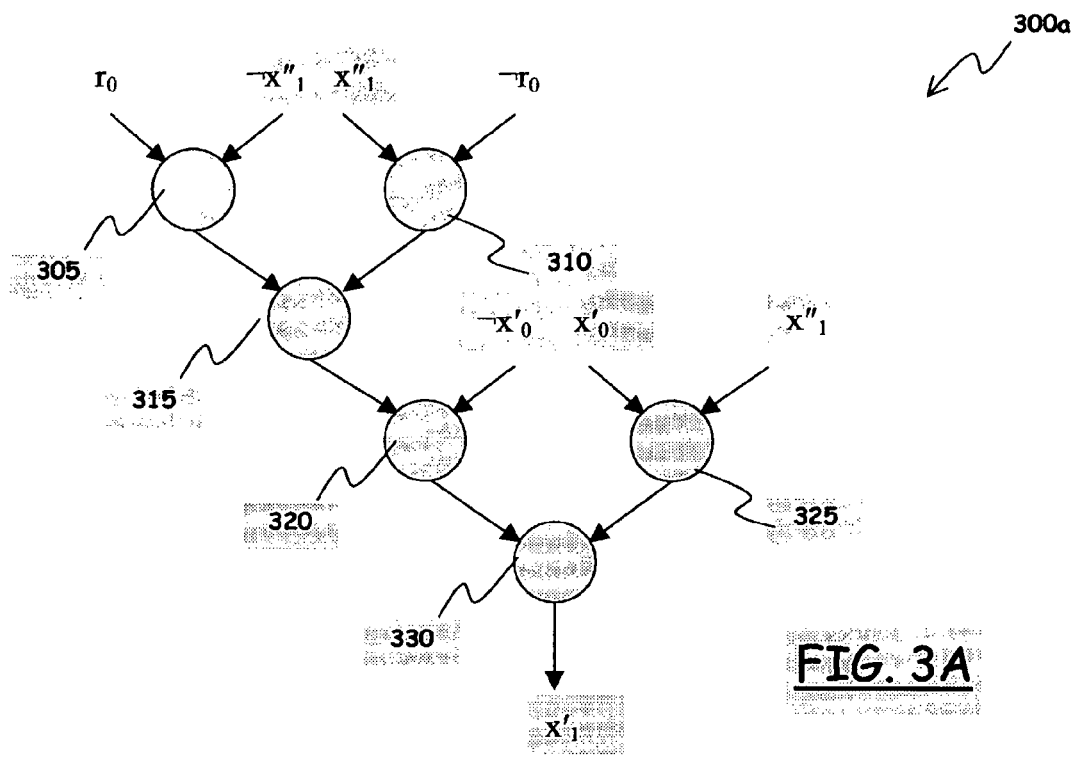
FIGS. 3A and 3B are schematic diagrams of logic circuits adapted to implement a mask conversion method according to a second embodiment of the present invention, for the conversion from arithmetic random masking to Boolean random masking.
Figure 3B:
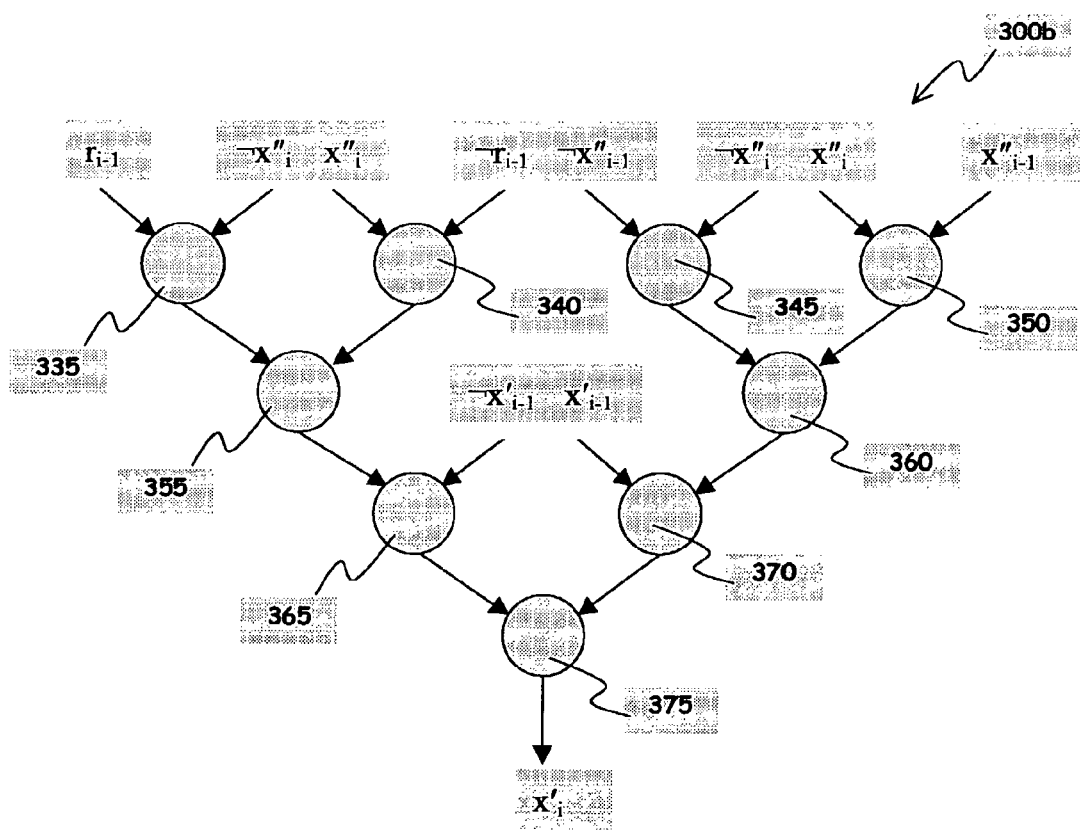

The equations (3) can be practically implemented, in hardware, by means of simple logic gates, as depicted in FIGS. 3A and 3B, wherein reference numeral 300a denotes the logic circuit implementing the second equation of equations (3) (i.e., the circuit adapted to generate the bit $x'_1$ of the data word x' obtained from the starting data word x by applying the Boolean random mask), and reference numeral 300b identifies the logic circuit implementing the third equation of equations (3) (i.e., the circuit adapted to generate the generic further bit $x'_i$ of the data word x').

In particular, referring to FIG. 3A, the least significant bit $r_0$ of the mask word r and the logic complement of the bit $x''_1$ of the arithmetic-masked data word x'' are combined in AND by an AND logic gate 305; the bit $x''_1$ is also combined in AND with the logic complement of the random mask bit $r_0$ by an AND logic gate 310. The outputs of the two AND logic gates 305 and 310 are fed to an OR logic gate 315. The output of the OR logic gate 315 is combined in AND with the logic complement of the least significant bit $x'_0$ of the Boolean-masked data word x' by an AND logic gate 320; the bit $x'_0$ is also combined in AND with the bit $x''_1$ by an AND logic gate 325. The outputs of the AND logic gates 320 and 325 are OR-ed together by an OR logic gate 330, to produce the desired bit $x'_1$.

Referring to FIG. 3B, the bit $r_{i-1}$ of the mask word r and the logic complement of the bit $x''_i$ of the arithmetic-masked data word x'' are combined in AND by an AND logic gate 335; the bit $x''_i$ is also combined in AND with the logic complement of the random mask bit $r_{i-1}$ by an AND logic gate 340. Furthermore, the logic complement of the bit $x''_{i-1}$ of the arithmetic-masked data word x'' and the logic complement of the bit $x''_i$ are combined in AND by an AND logic gate 345; the bits $x''_i$ and $x''_{i-1}$ are also combined in AND by an AND logic gate 350.

Outputs of the two AND logic gates 335 and 340 are fed to an OR logic gate 355. Similarly, outputs of the two AND logic gates 345 and 350 are fed to an OR logic gate 360.

The output of the OR logic gate 355 is combined in AND with the logic complement of the bit $x'_{i-1}$ by an AND logic gate 365. The bit $x'_{i-1}$ is also combined in AND with the output of the OR logic gate 360, by an AND logic gate 370. The outputs of the AND logic gates 365 and 370 are OR-ed together by an OR logic gate 375, to produce the desired bit $x'_i$.

It can be appreciated that also in this case, as in the previously described implementations, the only logic gates necessary for implementing the desired function are the OR, AND, and NOT gates (the NOT gates are not shown in the drawings for the sake of simplicity), which, from the hardware implementation viewpoint, are all elementary logic gates.

In equations (3), XOR operations can also in this case be identified, since they may be substituted for OR operations, as mentioned in the foregoing. Having in mind that the XOR operation can be viewed as a special case of the MUX operation, equations (3) can accordingly also be put in the following equivalent form (equations (4)):

$$x'_0 = x''_0$$

$$x'_1 = \text{MUX}(x''_1 +_2 r_0, x''_1, x'_0)$$

$$x'_i = \text{MUX}(x''_i +_2 r_{i-1}, x''_i +_2 \neg x''_{i-1}, x'_{i-1}), \text{for } 2 \leq i \leq n-1.$$

Figure 4A:
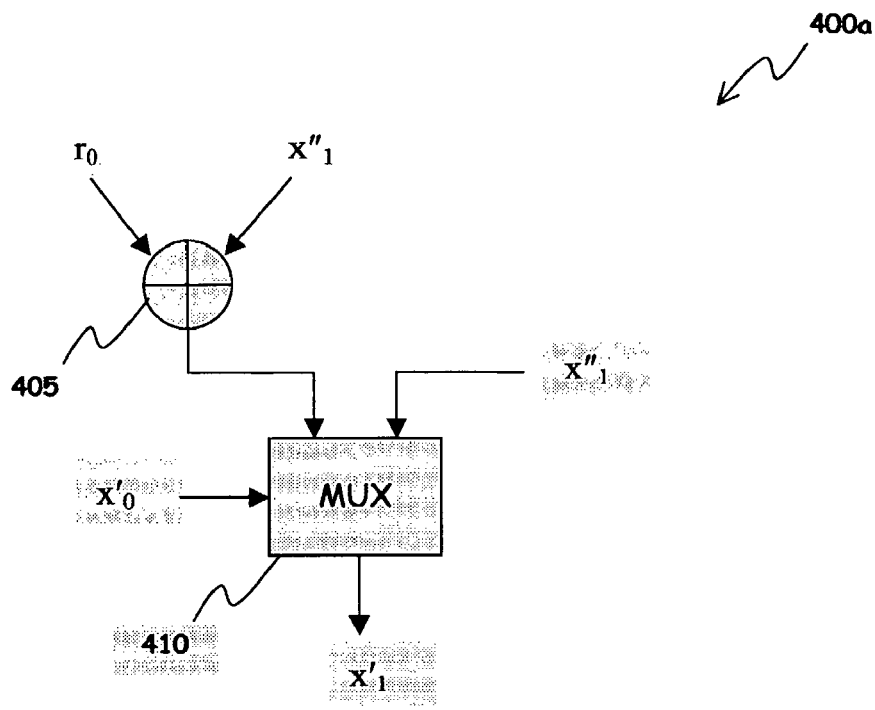
FIGS. 4A and 4B are schematic diagrams of logic circuits functionally equivalent to those depicted in FIGS. 3A and 3B, adapted to implement the mask conversion method according to the second embodiment of the present invention.
Figure 4B:
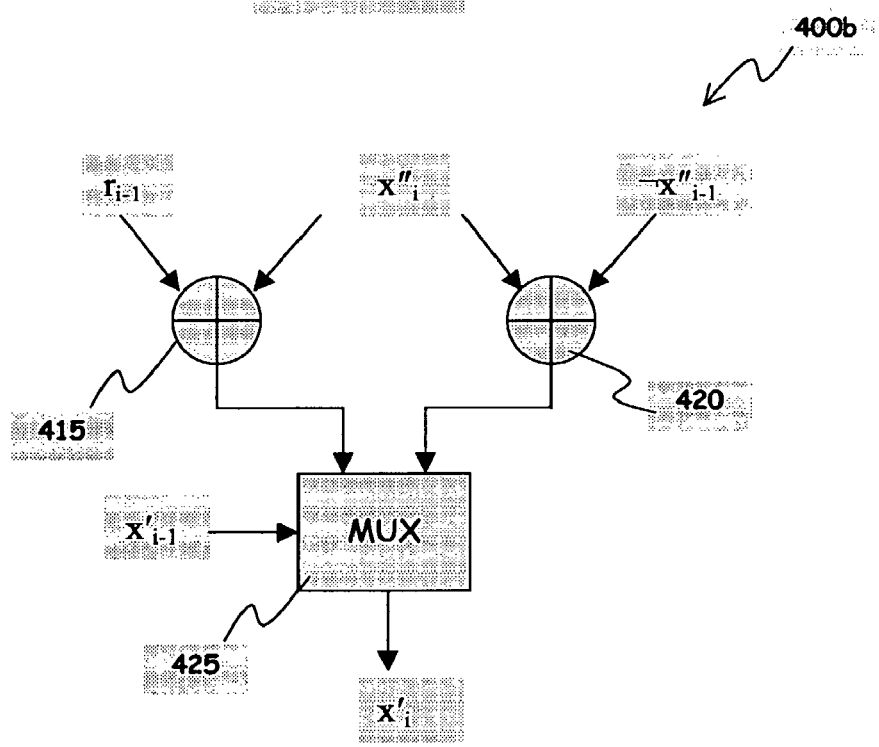

The equations (4) can be practically implemented, in hardware, by means of the logic circuits depicted in FIGS. 4A and 4B, which are functionally equivalent to those depicted in FIGS. 3A and 3B; reference numeral 400a denotes the logic circuit implementing the second equation of equations (4), and reference numeral 400b identifies the logic circuit implementing the third equation of equations (4) (also in this case the NOT logic gates are not shown, for simplicity of the drawings).

In particular, referring to FIG. 4A, the least significant bit $r_0$ of the mask word r and the bit $x''_1$ of the arithmetic-masked data word x'' are combined in XOR by an XOR logic gate 405; the output of the XOR logic gate 405 and the bit $x''_1$ form the inputs to a MUX logic gate 410, controlled by the bit $x'_0$; an output of the MUX logic gate 410 represents the desired bit $x'_1$.

Similarly, referring to FIG. 4B, the bit $r_{i-1}$ of the mask word r and the bit $x''_i$ of the arithmetic-masked data word x'' are combined in XOR by an XOR logic gate 415; the bit $x''_i$ is also combined in XOR with the logic complement of the bit $x''_{i-1}$, by means of an XOR logic gate 420.

The outputs of the XOR logic gates 415 and 420 form the inputs to a MUX logic gate 425, controlled by the bit $x'_{i-1}$; the output of the MUX logic gate 425 represents the desired bit $x'_i$.

A mathematical analysis can show that the output of each logic gate in the circuits of FIGS. 3A, 3B, 4A, and 4B is computed securely, i.e., that it has the same probability distribution for every fixed value of the input x. The desired randomization is provided by $x''_i$, that is, by the underlying masking bit $r_i$, which is independent of $r_{i-1}$, $x''_{i-1}$, and $x'_{i-1}$. As above, no additional masking bits are required.

Both in the case of the circuits of FIGS. 3A and 3B and in the case of the circuits of FIGS. 4A and 4B, the logic gate count is equivalent to 3n−4 MUX gates, and the depth is reduced to about n MUX gates. The depth reduction is due to the fact that the values $x''_{i-1}$ are already available.

In the following, other embodiments of the present invention will be described, which can be viewed as modifications of the embodiments described above in order to perform the conversion from arithmetic masking to Boolean random masking and vice versa, but with the random mask being subtracted from, instead of added to, the data.

In particular, FIGS. 5A, 5B, 6A, and 6B relate to a conversion method according to a third embodiment of the present invention, for the conversion from Boolean to arithmetic masking, but, differently from the first embodiment discussed, with the mask being subtracted from, instead of added to, the data to be masked.

In mathematical terms, the mask conversion problem is to compute securely $x''=x-_n r$ from $x'=x+_2 r$, where $-_n$ denotes the subtraction modulo $2^n$.

Since $$-_n r = \neg r +_n 1,$$

it follows that:

$$x -_n r = x +_n \neg r +_n 1.$$

Accordingly, the desired mask conversion can be performed by implementing the following equations (equations 5):

$$x''_0 = x'_0$$

$$x''_1 = x'_0(\neg x'_1 r_0 \text{ OR } x'_1 \neg r_0) \text{ OR } \neg x'_0 x'_1$$

$$x''_i = x'_{i-1}(\neg x'_i r_{i-1} \text{ OR } x'_i \neg r_{i-1}) \text{ OR } \neg x'_{i-1}$$
$$(\neg x'_i x''_{i-1} \text{ OR } x'_i \neg x''_{i-1}), \text{ for } 2 \leq i \leq n-1.$$

Figure 5A:
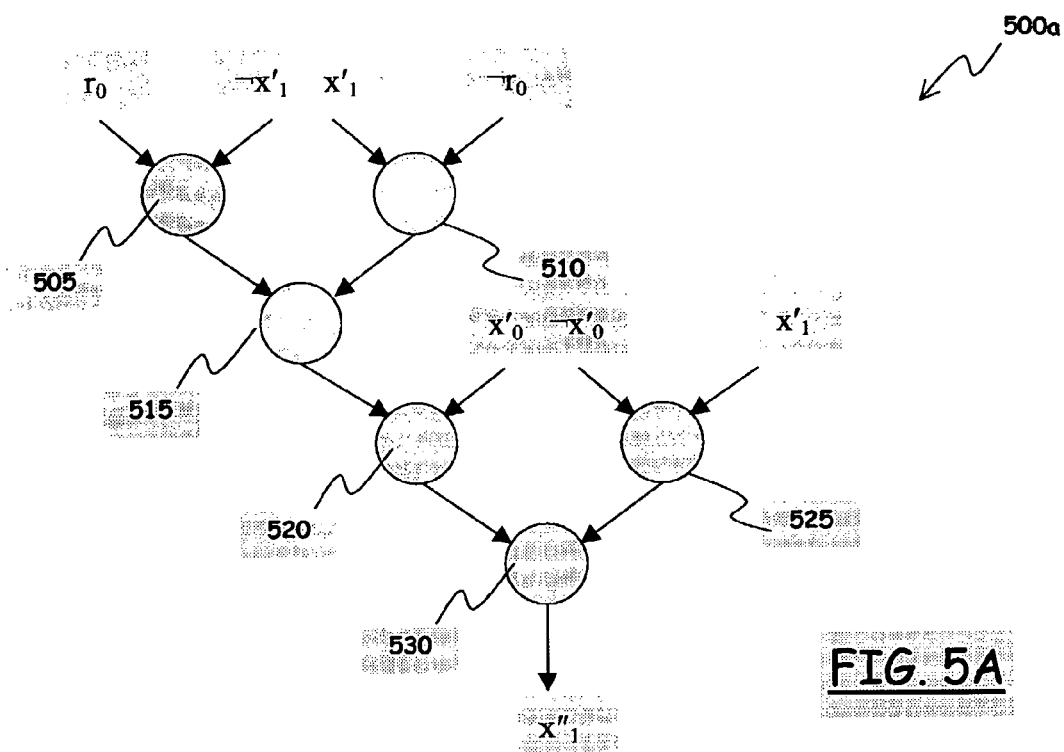
FIGS. 5A and 5B are schematic diagrams of logic circuits adapted to implement a mask conversion method according to a third embodiment of the present invention, for the conversion from Boolean random masking to arithmetic random masking.
Figure 5B:
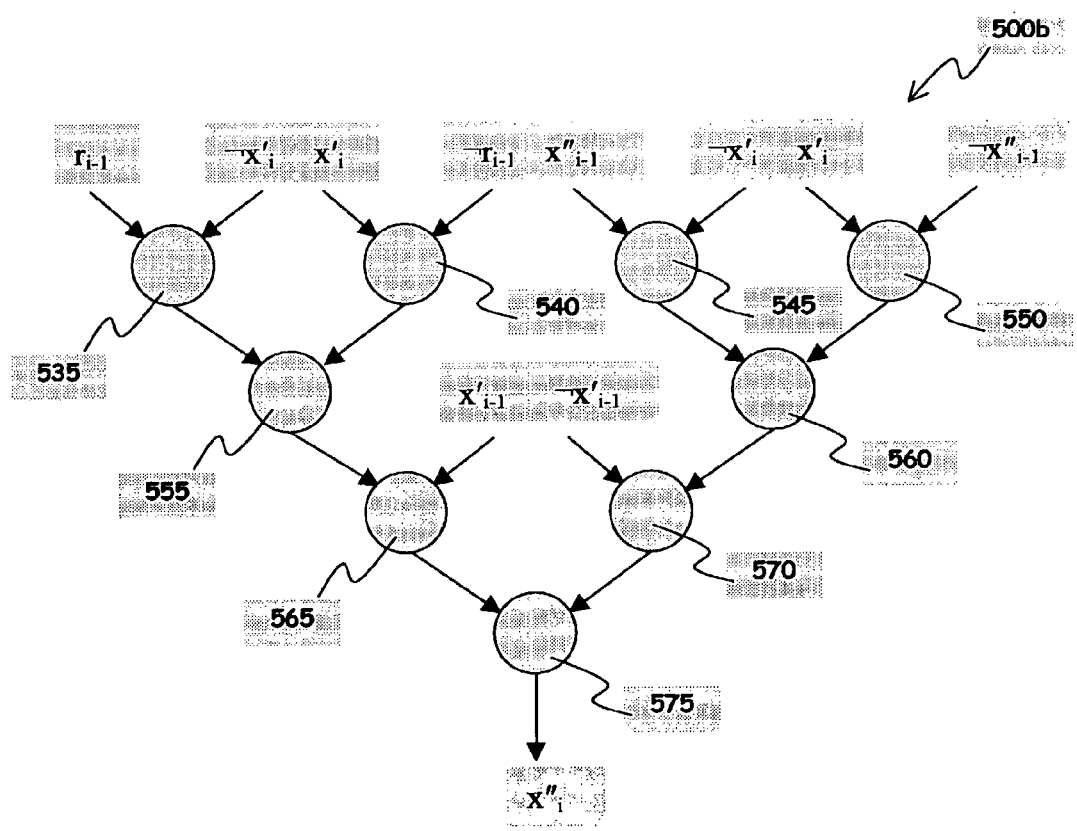

The equations (5) can be practically implemented, in hardware, by means of simple logic gates, as depicted in FIGS. 5A and 5B, wherein reference numeral 500a denotes the logic circuit implementing the second equation of equations (5) (i.e., the circuit adapted to generate the bit $x''_1$ of the data word $x''$ obtained from the starting data word $x$ by applying the arithmetic random mask), and reference numeral 500b identifies the logic circuit implementing the third equation of equations (1) (i.e., the circuit adapted to generate the generic further bit $x''_i$ of the data word $x''$).

In particular, referring to FIG. 5A, the least significant bit $r_0$ of the mask word $r$ and the logic complement of the bit $x'_1$ of the Boolean-masked data word $x'$ are combined in AND by an AND logic gate 505; the bit $x'_1$ is also combined in AND with the logic complement of the random mask bit $r_0$ by an AND logic gate 510. The outputs of the two AND logic gates 505 and 510 are fed to an OR logic gate 515. The output of the OR logic gate 515 is combined in AND with the least significant bit $x'_0$ of the Boolean-masked data word $x'$ by an AND logic gate 520; the logic complement of the bit $x'_0$ is also combined in AND with the bit $x'_1$ by an AND logic gate 525. The outputs of the AND logic gates 520 and 525 are OR-ed together by an OR logic gate 530, to produce the desired bit $x''_1$.

Referring to FIG. 5B, the bit $r_{i-1}$ of the mask word $r$ and the logic complement of the bit $x'_i$ of the Boolean-masked data word $x'$ are combined in AND by an AND logic gate 535; the bit $x'_i$ is also combined in AND with the logic complement of the random mask bit $r_{i-1}$ by an AND logic gate 540. Furthermore, the bit $x''_{i-1}$ of the arithmetic-masked data word $x''$ and the logic complement of the bit $x'_i$ are combined in AND by an AND logic gate 545; the bit $x'_i$ and the logic complement of the bit $x''_{i-1}$ are also combined in AND by an AND logic gate 550.

Outputs of the two AND logic gates 535 and 540 are fed to an OR logic gate 555. Similarly, outputs of the two AND logic gates 545 and 550 are fed to an OR logic gate 560.

The output of the OR logic gate 555 is combined in AND with the bit $x'_{i-1}$ by an AND logic gate 565; the logic complement of the bit $x'_{i-1}$ is also combined in AND with the output of the OR logic gate 560, by an AND logic gate 570. The outputs of the AND logic gates 565 and 570 are OR-ed together by an OR logic gate 575, to produce the desired-bit $x''_i$.

It can be appreciated that, as in the previously described embodiments, the logic gates necessary for implementing the desired function are simply the OR, AND, and NOT gates (the NOT gates are not shown in the drawings for the sake of simplicity), which are all elementary gates from the hardware implementation viewpoint.

If, in equations (5), XOR operations are substituted for OR operations, and the XOR operations are viewed as a special case of the more general MUX operation, then equations (5) can be put in the following form (equations (6)):

$$x''_0 = x'_0$$

$$x''_1 = \text{MUX}(x'_1 +_2 r_0, x'_1, \neg x'_0)$$

$$x''_i = \text{MUX}(x'_i +_2 r_{i-1}, x'_i +_2 x''_{i-1}, \neg x'_{i-1}), \text{ for } 2 \leq i \leq n-1.$$

Figure 6A:
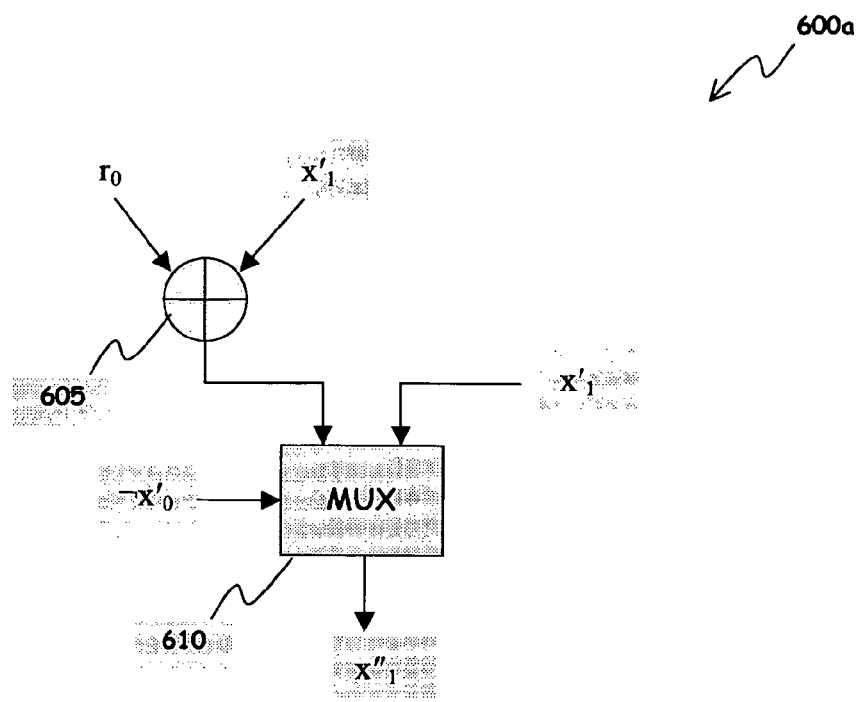
FIGS. 6A and 6B are schematic diagrams of logic circuits functionally equivalent to those depicted in FIGS. 5A and 5B, adapted to implement the mask conversion method according to the third embodiment of the present invention.
Figure 6B:
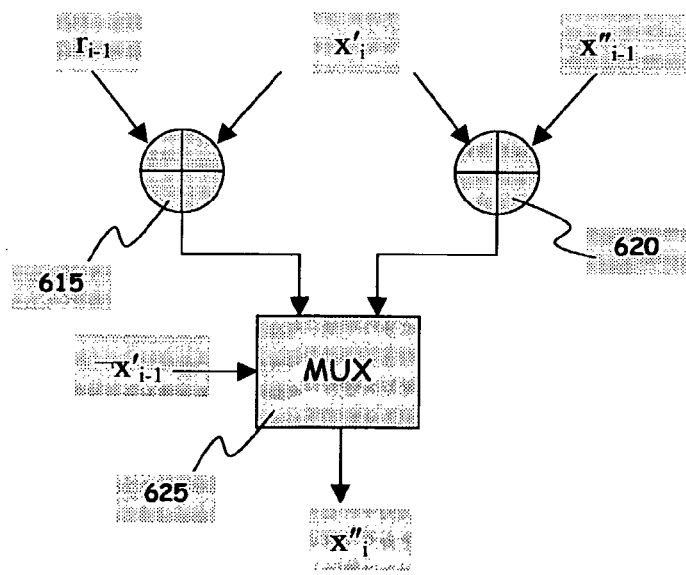

The equations (6) can be practically implemented, in hardware, by means of the logic circuits depicted in FIGS. 6A and 6B, which are functionally equivalent to those depicted in FIGS. 5A and 5B, and wherein reference numeral 600a denotes the logic circuit implementing the second equation of equations (6), and reference numeral 600b identifies the logic circuit implementing the third equation of equations (6) (also in this case the NOT logic gates are not shown, for simplicity of the drawings).

In particular, referring to FIG. 6A, the least significant bit $r_0$ of the mask word $r$ and the bit $x'_1$ of the Boolean-masked data word $x'$ are combined in XOR by an XOR logic gate 605; the output of the XOR logic gate 605 and the bit $x'_1$ form the inputs to a MUX logic gate 610, controlled by the logic complement of the bit $x'_0$; an output of the MUX logic gate 610 represents the desired bit $x''_1$.

Similarly, referring to FIG. 6B, the bit $r_{i-1}$ of the mask word $r$ and the bit $x'_i$ of the Boolean-masked data word $x'$ are combined in XOR by an XOR logic gate 615; the bit $x'_i$ is also combined in XOR with the bit $x''_{i-1}$, by an XOR logic gate 620.

The outputs of the XOR logic gates 615 and 620 form the inputs to a MUX logic 625, controlled by the logic complement of the bit $x'_{i-1}$; the output of the MUX logic gate 625 represents the desired bit $x''_i$.

The logic circuits are equivalent to those shown in FIGS. 1A, 2A, 3A, and 3B, and all the computations remain secure.

Both in the case of the circuits of FIGS. 5A and 5B and in the case of the circuits of FIGS. 6A and 6B, the logic gate count is equivalent to 3n–4 MUX gates, and the depth is about 2(n–1) MUX gates.

FIGS. 7A, 7B, 8A, and 8B, relate to a conversion method according to a fourth embodiment of the present invention, for the conversion from arithmetic to Boolean masking, but, differently from the second embodiment discussed in the foregoing, with the mask being subtracted from, instead of added to, the data to be masked.

In mathematical terms, the mask conversion problem is to compute securely $x'=x+_2 r$ from $x'=x-_n r$.

The desired conversion is obtained by the equations (equations (7)):

$$x'_0 = x''_0$$

$$x'_1 = x'_0(\neg x''_1 r_0 \text{ OR } x''_1 \neg r_0) \text{ OR } \neg x'_0 x''_1$$

$$x'_i = x'_{i-1}(\neg x''_i r_{i-1} \text{ OR } x''_i \neg r_{i-1}) \text{ OR } \neg x'_{i-1}$$
$$(\neg x''_i \neg x''_{i-1} \text{ OR } x''_i \neg x''_{i-1}), \text{ for } 2 \leq i \leq n-1.$$

Figure 7A:
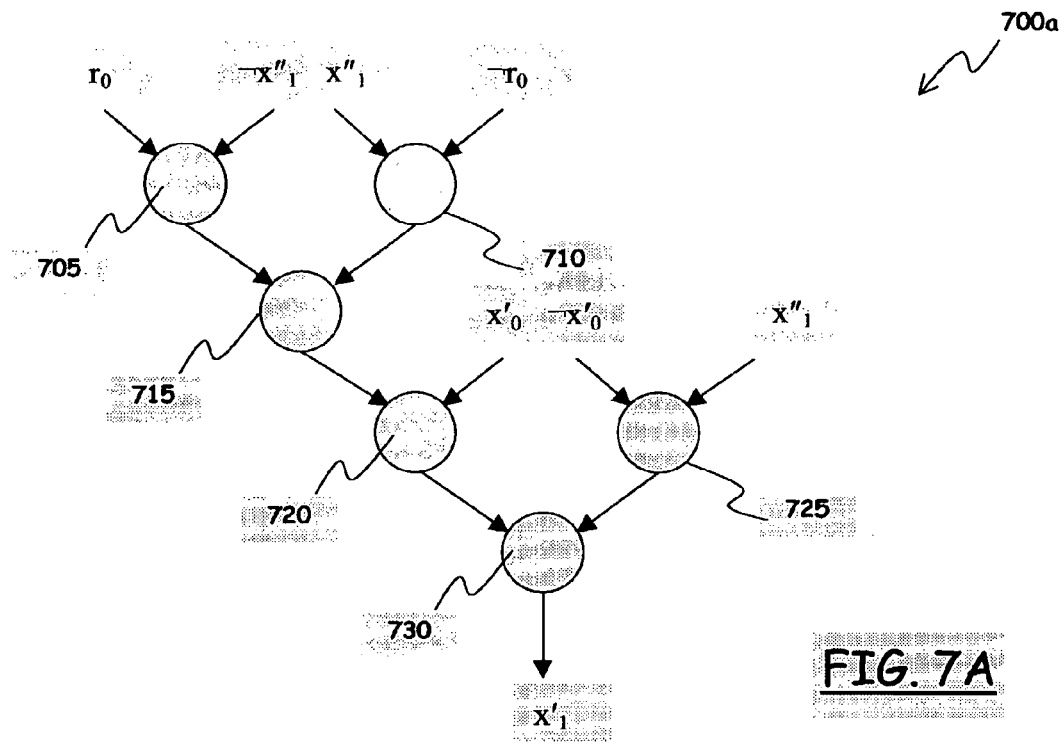
FIGS. 7A and 7B are schematic diagrams of logic circuits adapted to implement a mask conversion method according to a fourth embodiment of the present invention, for the conversion from arithmetic random masking to Boolean random masking.
Figure 7B:
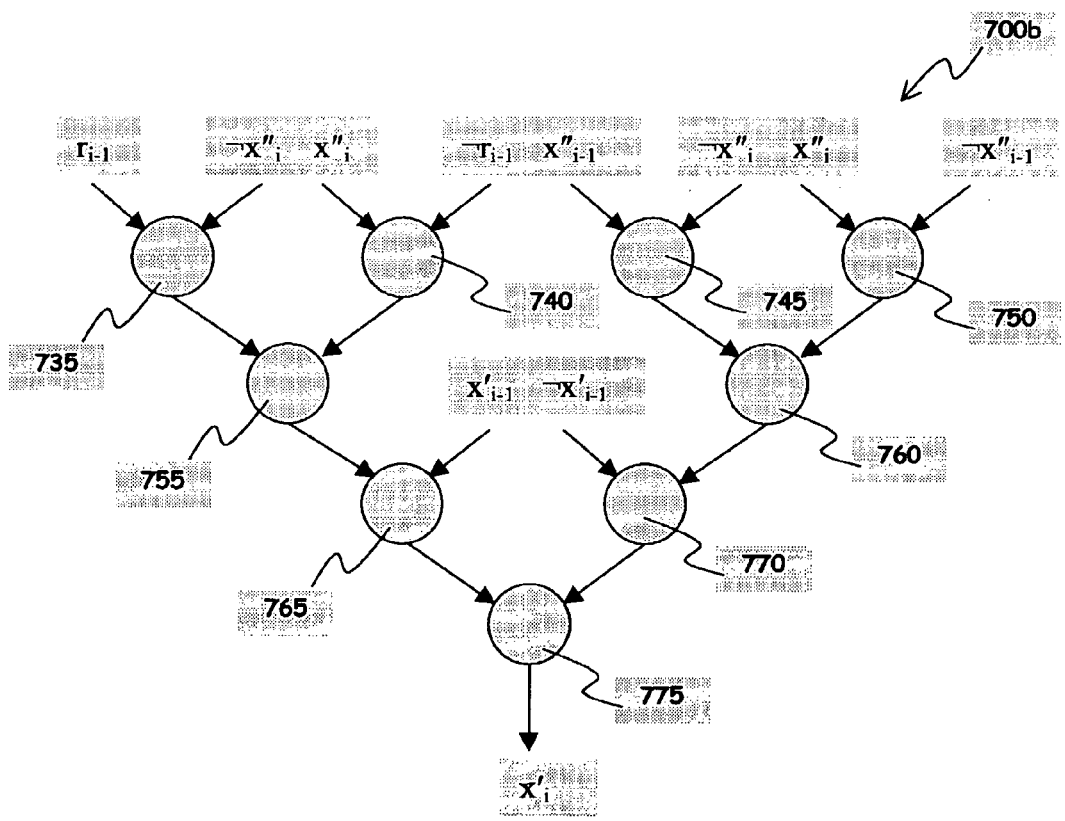

The equations (7) can be practically implemented, in hardware, by means of simple logic gates, as depicted in FIGS. 7A and 7B, wherein reference numeral 700a denotes the logic circuit implementing the second equation of equations (7) (i.e., the circuit adapted to generate the bit $x'_1$ of the data word $x'$ obtained from the starting data word $x$ by applying the Boolean random mask), and reference numeral 700b identifies the logic circuit implementing the third equation of equations (7) (i.e., the circuit adapted to generate the generic further bit $x'_i$ of the data word $x'$).

In particular, referring to FIG. 7A, the least significant bit $r_0$ of the mask word $r$ and the logic complement of the bit $x''_1$ of the arithmetic-masked data word $x''$ are combined in AND by an AND logic gate 705; the bit $x''_1$ is also combined in AND with the logic complement of the random mask bit $r_0$ by an AND logic gate 710. The outputs of the two AND logic gates 705 and 710 are fed to an OR logic gate 715. The output of the OR logic gate 715 is combined in AND with the least significant bit $x'_0$ of the Boolean-masked data word $x'$ by an AND logic gate 720; the logic complement of the bit $x'_0$ is also combined in AND with the bit $x''_1$ by an AND logic gate 725. The outputs of the AND logic gates 720 and 725 are OR-ed together by an OR logic gate 730, to produce the desired bit $x'_1$.

Referring to FIG. 7B, the bit $r_{i-1}$ of the mask word $r$ and the logic complement of the bit $x''_i$ of the arithmetic-masked data word $x''$ are combined in AND by an AND logic gate 735; the bit $x''_i$ is also combined in AND with the logic complement of the random mask bit $r_{i-1}$ by an AND logic gate 740. Furthermore, the bit $x''_{i-1}$ of the arithmetic-masked data word $x''$ and the logic complement of the bit $x''_i$ are combined in AND by an AND logic gate 745; the bit $x''_i$ and the logic complement of the bit $x''_{i-1}$ are also combined in AND by an AND logic gate 750.

Outputs of the two AND logic gates 735 and 740 are fed to an OR logic gate 755. Similarly, outputs of the two AND logic gates 745 and 750 are fed to an OR logic gate 760.

The output of the OR logic gate 755 is combined in AND with the bit $x'_{i-1}$ by an AND logic gate 765; the logic complement of the bit $x'_{i-1}$ is also combined in AND with the output of the OR logic gate 760, by an AND logic gate 770. The outputs of the AND logic gates 765 and 770 are OR-ed together by an OR logic gate 775, to produce the desired bit $x'_i$.

It can be appreciated that also in this case, as in the previously described implementations, the only logic gates necessary for implementing the desired function are the OR, AND, and NOT gates (the NOT gates are not shown in the drawings for the sake of simplicity), which, from the hardware implementation viewpoint, are all elementary logic gates.

If, in equations (7), XOR operations are substituted for OR operations (the XOR operation being a special case of the MUX operation), equations (7) can also be put in the following form (equations (8)):

$$x'_0 = x''_0$$

$$x'_1 = \text{MUX}(x''_1 + _2 r_0, x''_1, \neg x'_0)$$

$$x'_i = \text{MUX}(x''_i + _2 r_{i-1}, x''_i + _2 x''_{i-1}, \neg x'_{i-1}),$$
for $2 \leq i \leq n-1$.

Figure 8A:
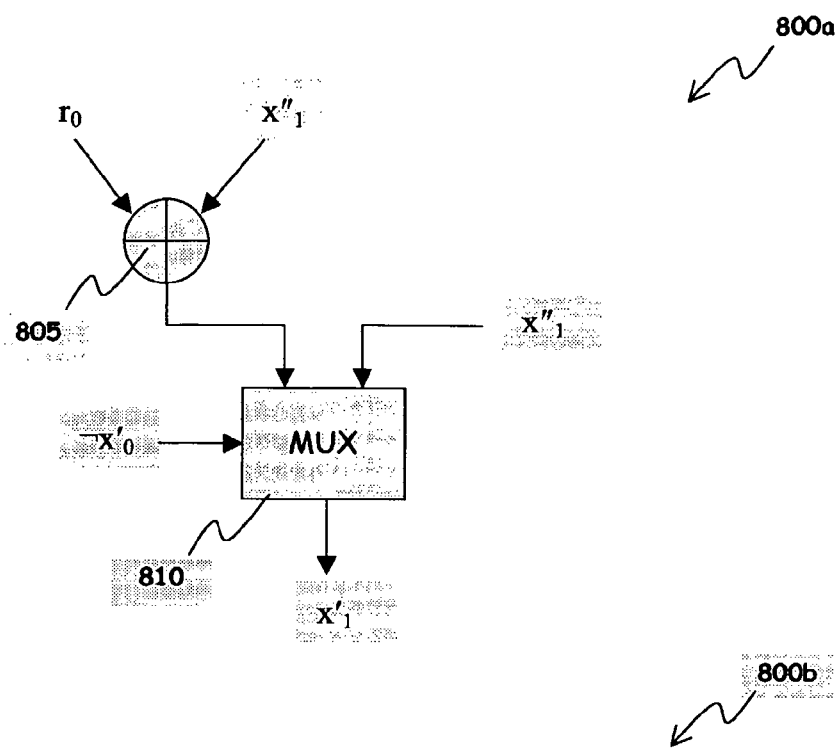
FIGS. 8A and 8B are schematic diagrams of logic circuits functionally equivalent to those depicted in FIGS. 7A and 7B, adapted to implement the mask conversion method according to the fourth embodiment of the present invention.
Figure 8B:
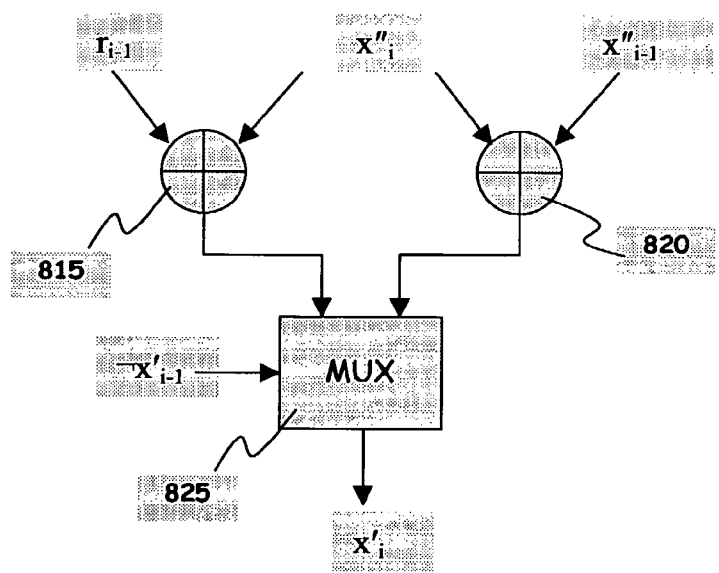

The equations (8) can be practically implemented, in hardware, by means of the logic circuits depicted in FIGS. 8A and 8B, which are functionally equivalent to those depicted in FIGS. 7A and 7B; reference numeral 800a denotes the logic circuit implementing the second equation of equations (8), and reference numeral 800b identifies the logic circuit implementing the third equation of equations (8) (also in this case the NOT logic gates are not shown, for simplicity of the drawings).

In particular, referring to FIG. 8A, the least significant bit $r_0$ of the mask word $r$ and the bit $x''_1$ of the arithmetic-masked data word $x''$ are combined in XOR by an XOR logic gate 805; the output of the XOR logic gate 805 and the bit $x''_1$ form the inputs to a MUX logic gate 810, controlled by the logic complement of the bit $x'_0$; an output of the MUX logic gate 810 represents the desired bit $x'_1$.

Similarly, referring to FIG. 8B, the bit $r_{i-1}$ of the mask word $r$ and the bit $x''_i$ of the arithmetic-masked data word $x''$ are combined in XOR by an XOR logic gate 815; the bit $x''_i$ is also combined in XOR with the bit $x''_{i-1}$, by means of an XOR logic gate 820.

The outputs of the XOR logic gates 815 and 820 form the inputs to a MUX logic gate 825, controlled by the logic complement of the bit $x'_{i-1}$; the output of the MUX logic gate 825 represents the desired bit $x'_i$.

Both in the case of the circuits of FIGS. 7A and 7B and in that of the circuits of FIGS. 8A and 8B, the logic gate count is equivalent to $3n-4$ MUX gates, whereas the depth is reduced to about $n$ MUX gates.

Figure 9A:
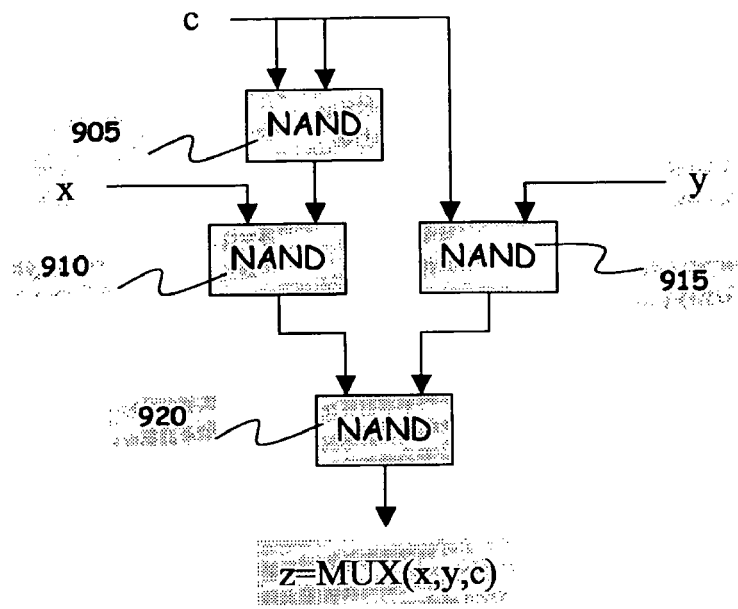
FIGS. 9A and 9B are schematic diagrams of logic circuits adapted to implement a MUX logic gate and an XOR logic gate, respectively, in terms of NAND logic gates, suitable to be implemented in the CMOS transistor technology.
Figure 9B:
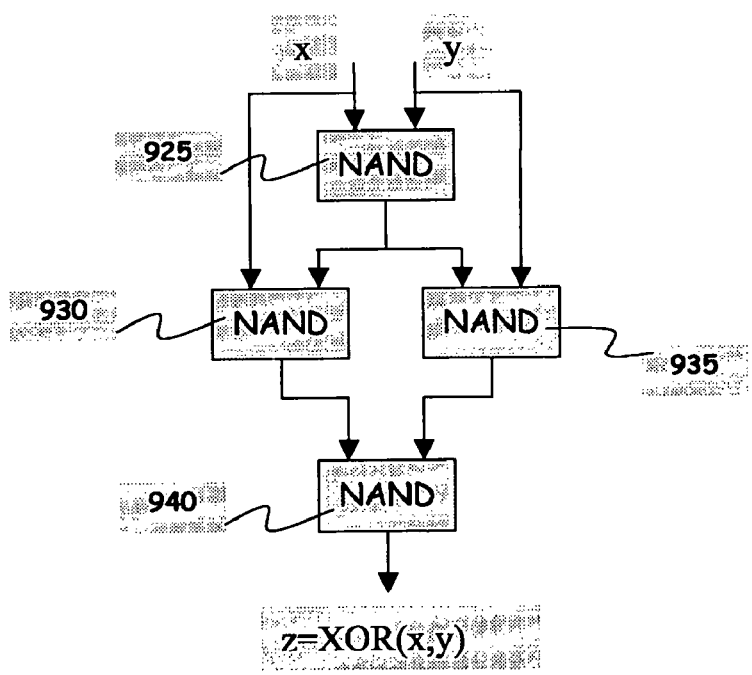

FIGS. 9A and 9B depict the logic circuits consisting of the NAND logic gates implementing a MUX logic gate and an XOR logic gate, respectively, where a NAND logic gate implements an operation being a logic complement of the logic AND operation. It is well known to those skilled in the field of solid-state ICs, that the NAND logic gates are suitable to be implemented in CMOS transistor technology and that every Boolean function can be represented in terms of the NAND logic gates.

In particular, referring to FIG. 9A, a first two-input NAND logic gate 905 receives, at both its inputs, a logic signal $c$ intended to represent a control signal for the equivalent MUX logic gate. An output of the first NAND logic gate 905 is fed to a first input of a second two-input NAND logic gate 910, receiving at its second input the first input $x$ to the equivalent MUX logic gate. A third two-input NAND logic gate receives at its inputs the control signal $c$ and the second input $y$ to the equivalent MUX logic gate. The outputs of the second and third NAND logic gates 910 and 915 are fed to a fourth two-input NAND logic gate 920, respectively, whose output forms the output $z$ of the equivalent MUX logic gate.

Similarly, referring to FIG. 9B, a first two-input NAND logic gate 925 receives the inputs $x$ and $y$ to the equivalent XOR logic gate. An output of the first NAND logic gate 925 is fed to a first input of both a second and a third two-input NAND logic gates 930 and 935, respectively receiving at their second input the inputs $x$ and $y$ to the equivalent XOR logic gate. The outputs of the second and third NAND logic gates 930 and 935 are fed to a fourth two-input NAND logic gate 940, respectively, whose output forms the output $z$ of the equivalent XOR logic gate.

Consequently, logic circuits shown in FIGS. 2A and 2B, FIGS. 4A and 4B, FIGS. 6A and 6B, and FIGS. 8A and 8B, can be implemented in terms of NAND logic gates only, by replacing each XOR logic gate by a circuit from FIG. 9A and each MUX logic gate by a circuit from FIG. 9B. The NOT logic gate in FIGS. 2B and 4B can be implemented, for example, by using one NAND logic gate. By using similar arguments, it can be shown that all the computations on the NAND logic gate level remain secure, i.e., that the output of each NAND logic gate is statistically independent of the input. The resulting logic circuits are thus suitable to be implemented in CMOS transistor technology. Alternatively, the XOR gate with one input negated (XNOR), in FIGS. 2B and 4B, can also be securely implemented by using three NAND gates and one NOR gate, which is also easy to be implemented in CMOS transistor technology.

Thanks to the present invention, secure mask conversion can be easily implemented in hardware, for example in IC chips, thereby making cryptographic algorithms implemented thereby secure even against subtle side-channel attacks such as DPA.

The present invention can be applied in general whenever hardware implementation of a cryptographic function, involving the operations of bitwise XOR and integer addition modulo 2, is envisaged, and particularly, albeit not limitatively, in the case of smart-cards such as SIM cards of the type used in modern mobile communications networks.

Although the present invention has been disclosed and described by way of some embodiments, it is apparent to those skilled in the art that several modifications to the described embodiments, as well as other embodiments of the present invention are possible without departing the scope thereof as defined in the appended claims. In particular, instead of the school method for integer addition with carry, other methods can be used, for example, those where the underlying one-bit full adders are arranged in a (Wallace) tree to reduce the total depth and then adapt the proposed methods accordingly.

The invention claimed is:

1. A method for secure conversion between two different random maskings used for cryptographic functions, comprising converting a first binary data word masked by a binary mask word according to a first masking process, into a corresponding second binary data word masked by said binary mask word according to a second masking process, the first and second binary data words and the binary mask word comprising corresponding pluralities of bits wherein each of said pluralities of bits comprises a least significant bit, and at least one i-th bit, $i \geq 2$, wherein converting a first binary data word into a second binary data word comprises:
  taking as a least significant bit of the second binary data word the least significant bit of the first binary data word;
  calculating the first bit of the second binary data word by:
    performing a first XORing of the least significant bit of the binary mask word with the first bit of the first binary data word and selecting as a value of the first bit of the second binary data word either a result of said first XORing or the first bit of the first binary data word, depending on a value related to the least significant bit of the first or the second binary data word; and
  calculating the i-th bit of the second binary data word by:
    performing a second XORing of the i-th bit of the first binary data word with the (i−1)-th bit of the binary mask word;
    performing a third XORing of the i-th bit of the first binary data word with a first value related to the (i−1)-th bit of the first or the second binary data word; and
    selecting as a value of the i-th bit of the second binary data word a result of either said second XORing or said third XORing, depending on a second value related to the (i−1)-th bit of the first or the second binary data word.

2. The method according to claim 1, wherein said performing the first XORing comprises:
  performing a first logic AND of the least significant bit of the binary mask word with a logic complement of the first bit of the first binary data word;
  performing a second logic AND of a logic complement of the least significant bit of the binary mask word with the first bit of the first binary data word; and
  performing a logic OR of the results of said first and second logic ANDs.

3. The method according to claim 1, wherein said selecting as a value of the first bit of the second binary data word either the result of said first XORing or the first bit of the first binary data word, depending on a value related to the least significant bit of the first or the second binary data word, comprises:
  performing a third logic AND of the result of said first XORing with a logic complement of said value related to the least significant bit of the first or the second binary data word;
  performing a fourth logic AND of the first bit of the first binary data word with said value related to the least significant bit of the first or the second binary data word; and
  performing a logic OR of the results of said third and fourth logic ANDs.

4. The method according to claim 1, wherein said performing the second XORing comprises:
  performing a fifth logic AND of a logic complement of the i-th bit of the first binary data word with the (i−1)-th bit of the binary mask word;
  performing a sixth logic AND of the i-th bit of the first binary data word with a logic complement of the (i−1)-th bit of the binary mask word; and
  performing a logic OR of the results of said fifth and sixth logic ANDs.

5. The method according to claim 1, wherein said performing the third XORing comprises:
  performing a seventh logic AND of a logic complement of the i-th bit of the first binary data word with said first value related to the (i−1)-th bit of the first or the second binary data word;
  performing an eighth logic AND of the i-th bit of the first binary data word with a logic complement of said first value related to the (i−1)-th bit of the first or the second binary data word; and
  performing a logic OR of the results of said seventh and eight logic ANDs.

6. The method according to claim 1, wherein said selecting as a value of the i-th bit of the second binary data word a result of either said second XORing or said third XORing, depending on a second value related to the (i−1)-th bit of the first or the second binary data word, comprises:
  performing a ninth logic AND of the result of said second XORing with a logic complement of said second value related to the (i−1)-th bit of the first or the second binary data word;
  performing a tenth logic AND of the result of said third XORing with said second value related to the (i−1)-th bit of the first or the second binary data word; and
  performing a logic OR of the results of said ninth and tenth logic ANDs.

7. The method according to claim 1, wherein said performing one or more among said first, second, and third XORing comprises:
  performing a first logic NAND of a first and a second operands of said XORing;
  performing a second logic NAND of the first operand and of a result of said first logic NAND;
  performing a third logic NAND of the second operand and of a result of said first logic NAND; and
  performing a fourth logic NAND of the results of said second and third logic NANDs.

8. The method according to claim 1, wherein said selecting as a value of the first bit of the second binary data word either a result of said first XORing or the first bit of the first binary data word, depending on a value related to the least significant bit of the first or the second binary data word, comprises:
supplying as a first and a second operands to a fifth logic NAND said value related to the least significant bit of the first or the second binary data word;
performing a sixth logic NAND between a result of said fifth logic NAND and a result of said first XORing;
performing a seventh logic NAND between a result of said fifth logic NAND and the first bit of the first binary data word; and
performing an eighth logic NAND of the result of said seventh and eighth logic NANDs.

9. The method according to claim 1, wherein said selecting as a value of the i-th bit of the second binary data word a result of either said second XORing or said third XORing, depending on a second value related to the (i−1)-th bit of the first or the second binary data word, comprises:
supplying as a first and a second operands to a ninth logic NAND said second value related to the (i−1)-th bit of the first or the second binary data word:
performing a tenth logic NAND between a result of said ninth logic NAND and a result of said second XORing;
performing an eleventh logic NAND between a result of said ninth logic NAND and a result of said third XORing; and
performing a twelfth logic NAND of the result of said tenth and eleventh logic NANDs.

10. A mask conversion circuit for conversion between two different random maskings used for cryptographic functions, the mask conversion circuit being adapted to convert a first binary data word masked by a binary mask word according to a first masking process into a corresponding second binary data word masked by said binary mask word according to a second masking process, the first and second binary data words and the binary mask word comprising corresponding pluralities of bits wherein each of said pluralities of bits comprises a least significant bit, a first bit and at least an i-th bit, $i \geq 2$, the mask conversion circuit comprising:
an identity-function circuit for making the least significant bit of the second binary data word correspond to the least significant of the first binary data word;
a first XOR-function circuit adapted to XORing the least significant bit of the binary mask word with the first bit of the first binary data word;
a first selector circuit adapted to select as a value of the first bit of the second binary data word either an output of said first XOR-function circuit or the first bit of the first binary data word, depending on a value related to the least significant bit of the first or the second binary data word; for each i-th bit of the second binary data word, a respective circuit arrangement comprising:
a second XOR-function circuit adapted to XORing the i-th bit of the first binary data word with the (i−1)-th bit of the binary mask word;
a third XOR-function circuit adapted to XORing the i-th bit of the first binary data word with a first value related to the (i−1)-th bit of the first or the second binary data word; and
a second selector circuit adapted to selecting as a value of the i-th bit of the second binary data word a result of either said second or said third XOR-function circuit, depending on a second value relate to the (i−1)-th bit of one from the first and second binary data words.

11. The mask conversion circuit arrangement according to claim 10, wherein said first XOR function circuit comprises:
a first logic AND circuit adapted to ANDing the least significant bit of the binary mask word with a logic complement of the first bit of the first binary data word;
a second logic AND circuit adapted to ANDing a logic complement of the least significant bit of the binary mask word with the first bit of the first binary data word; and
a first logic OR circuit adapted to ORing the results of said first and second logic AND circuits.

12. The mask conversion circuit arrangement according to claim 10, wherein said first selector circuit comprises:
a third logic AND circuit for ANDing the result of said first logic XOR circuit with said value related to the least significant bit of the first or the second binary data word;
a fourth logic AND circuit for ANDing the first bit of the first binary data word with said value related to the least significant bit of the first or the second binary data word; and
a second logic OR circuit for ORing the results of said third and fourth logic AND circuits.

13. The mask conversion circuit arrangement according to claim 10, wherein said second XOR function circuit comprises:
a fifth logic AND circuit for ANDing a logic complement of the i-th bit of the first binary data word with the (i−1)-th bit of the binary mask word;
a sixth logic AND circuit for ANDing the i-th bit of the first binary data word with a logic complement of the (i−1)-th bit of the binary mask word; and
a third OR circuit for ORing the outputs of said fifth and sixth logic AND circuits.

14. The mask conversion circuit arrangement according to claim 10, wherein said third XOR function circuit comprises:
a seventh logic AND circuit for ANDing a logic complement of the i-th bit of the first binary data word with said first value related to the (i−1)-th bit of the first or the second binary data word;
an eighth logic AND circuit for ANDing the i-th bit of the first binary data word with a logic complement of said first value related to the (i−1)-th bit of the first or the second binary data word; and
a fourth OR circuit for ORing the results of said seventh and eighth logic AND circuits.

15. The mask conversion circuit arrangement according to claim 10, wherein said second selector circuit comprises:
a ninth logic AND circuit for ANDing the output of said second XOR function circuit with a logic complement of said second value related to the (i−1)-th bit of the first or the second binary data word;
a tenth logic AND circuit for ANDing the output of said third XOR function circuit with said second value related to th (i−1)-th bit of the first or the second binary data word; and
a fifth logic OR circuit for ORing the outputs of said ninth and tenth logic AND circuits.

16. The mask conversion circuit arrangement according to claim 10, wherein one or more of said first, second, and third XOR logic circuits comprises:
a first logic NAND circuit for NANDing a first and a second operands of said XOR function circuit;
a second logic NAND circuit for NANDing the first operand and an output of said first logic NAND circuit;

a third logic NAND circuit for NANDing the second operand and an output of said first logic NAND circuit; and a fourth logic NAND circuit for NANDing the outputs of said second and third logic NAND circuits.

17. The mask conversion circuit arrangement according to claim 10, wherein said first selector circuit comprises:

a fifth logic NAND circuit receiving at both inputs said value related to the least significant bit of the first or the second binary data word;

a sixth logic NAND circuit for NANDing an output of said fifth logic NAND circuit and an output of said first XOR function circuit;

a seventh logic NAND circuit for NANDing an output of said fifth logic NAND circuit and the first bit of the first binary data word; and an eighth logic NAND circuit for NANDing the outputs of said seventh and eighth logic NAND circuits.

18. The mask conversion circuit arrangement according to claim 10, wherein said second selector circuit comprises:

a ninth logic NAND circuit receiving at both inputs said second value related to the (i−1)-th bit of the first or the second binary data word;

a tenth logic NAND circuit for NANDing an output of said ninth logic NAND circuit and an output of said second OR function circuit;

an eleventh logic NAND circuit for NANDing an output of said ninth logic NAND circuit and an output of said third XOR function circuit; and a twelfth logic NAND circuit for NANDing the outputs of said tenth and eleventh logic NAND circuits.

19. An integrated circuit integrating at least one mask conversion circuit arrangement and comprising the mask conversion circuit arrangement according to claim 10.

20. A smart-card comprising an integrated circuit according to claim 19.

21. A subscriber identity module adapted to be used in conjunction with user equipment in a communications network and comprising a smart-card according to claim 20.

* * * * *